(12) United States Patent
Cheng

(10) Patent No.: US 7,400,942 B2
(45) Date of Patent: Jul. 15, 2008

(54) APPARATUS FOR TEMPERATURE CONTROL USING A CYCLE RATE CONTROL ALGORITHM

(75) Inventor: Chung Ming Cheng, Tsuen Wan (CN)

(73) Assignee: Computime, Ltd., Hong Kong (HK)

( * ) Notice: Subject to any disclaimer, the term of this patent is extended or adjusted under 35 U.S.C. 154(b) by 316 days.

(21) Appl. No.: 11/334,259

(22) Filed: Jan. 18, 2006

(65) Prior Publication Data
US 2007/0168084 A1 Jul. 19, 2007

(51) Int. Cl.
G05D 23/00 (2006.01)
G05B 13/00 (2006.01)

(52) U.S. Cl. .................... 700/276; 165/267

(58) Field of Classification Search ............ 700/40–43, 700/276–278; 236/1 B, 1 C, 46 R, 91 D–91 G; 62/125, 132, 159–164; 165/200, 201, 238, 165/239, 243, 253–258, 265, 267–269, 287–289
See application file for complete search history.

(56) References Cited

U.S. PATENT DOCUMENTS

| | | | | |
|---|---|---|---|---|
| 4,270,693 A | * | 6/1981 | Hayes ..................... | 236/46 F |
| 4,292,813 A | | 10/1981 | Paddock | |
| 4,333,519 A | * | 6/1982 | Shafrir et al. ............... | 165/259 |
| 4,356,962 A | | 11/1982 | Levine | |
| 4,362,924 A | * | 12/1982 | Story et al. ................. | 219/497 |
| 4,387,763 A | * | 6/1983 | Benton ........................ | 165/238 |
| 4,460,123 A | * | 7/1984 | Beverly ..................... | 236/46 R |
| 4,694,890 A | * | 9/1987 | Zarate ........................ | 165/256 |
| 4,725,001 A | | 2/1988 | Carney et al. | |
| 4,753,388 A | * | 6/1988 | Rummage ................. | 236/46 R |
| 4,759,498 A | | 7/1988 | Levine et al. | |
| 4,787,555 A | | 11/1988 | Newell, III et al. | |
| 4,817,705 A | | 4/1989 | Levine et al. | |
| 4,901,918 A | * | 2/1990 | Grald et al. ............... | 236/78 D |
| 5,192,020 A | * | 3/1993 | Shah ........................ | 236/46 R |
| 5,613,369 A | | 3/1997 | Sato et al. | |
| 6,038,871 A | | 3/2000 | Gutierrez et al. | |

(Continued)

FOREIGN PATENT DOCUMENTS

EP 1489368 A 12/2004

OTHER PUBLICATIONS

Partial European Search Report for EP 07 25 0147, dated Apr. 9, 2008, pp. 1-3.

*Primary Examiner*—M. N. Von Buhr
(74) *Attorney, Agent, or Firm*—Banner & Witcoff, Ltd.

(57) ABSTRACT

The present invention controls a room temperature by controlling an environmental control unit. A total span about a setpoint temperature is adjusted in accordance with a previous total span and a multiplicative factor. The multiplicative factor is periodically updated from a desired cycle time and a previous cycle time. The room temperature may also be controlled by adjusting a duty cycle for controlling an environmental control unit. The duty cycle is adjusted based on an error associated with a previous control cycle and an attenuation factor. A new control cycle may be started by cutting the previous control cycle or a current control cycle may be extended if a predetermined condition is detected. The control mode is selected based on environmental characteristics and room characteristics. The control mode may include a span control mode and a duty cycle control mode that is selected from the cycle rate.

10 Claims, 31 Drawing Sheets

U.S. PATENT DOCUMENTS 6,179,213 B1 * 1/2001 Gibino et al. ............. 236/46 R
6,478,084 B1 * 11/2002 Kumar et al. ............... 165/255
6,622,500 B1   9/2003 Archibald et al.
6,622,926 B1 * 9/2003 Sartain et al. ............. 236/46 R
6,829,523 B2 * 12/2004 Hanson ...................... 700/299

* cited by examiner

APPARATUS FOR TEMPERATURE CONTROL USING A CYCLE RATE CONTROL ALGORITHM

FIELD OF THE INVENTION

The present invention relates generally to the field of controlling room temperature by either heating or cooling a room.

BACKGROUND OF THE INVENTION

With the increased price of fuel and electricity, efficient temperature control of buildings is increasingly important. Room temperature control typically utilizes a "temperature span" method, in which a temperature range is specified between a setpoint temperature plus a fixed span temperature and the setpoint temperature minus the fixed span temperature. When heating a room, a heating unit turns off when the room temperature is higher than the setpoint temperature plus span temperature and turns on when room temperature is lower than the setpoint temperature minus span temperature. Similarly, when cooling the room, a cooling unit turns off when the room temperature is lower than the setpoint temperature minus span temperature and turns on when the room temperature is higher than the setpoint temperature plus span temperature. This approach is not very flexible and typically does not adapt to the characteristics of the room or changing environmental factors, thus lowering the efficiency of the cooling or heating unit. This approach is limited by the inherent span temperature resolution, which is dependent on hardware of an electronic digital thermostat, e.g., an analog to digital (A/D) converter, causing an error in the room temperature. Moreover, with thermal time delays of the controlled room and of the thermostat housing, the temperature span setting in the electronic digital thermostat is usually not achievable. Consequently, prior art temperature control often results in a large swing in the room temperature which is not comfortable to the user and may also lead to lower efficiency.

Consequently, there is a need to control a temperature of a room that is sufficiently accurate and that provides improved energy efficiency.

SUMMARY OF THE INVENTION

The present invention provides methods and apparatuses that control a temperature of a room by controlling an environmental control unit. The environmental control unit may include a heating unit and/or a cooling unit.

With one aspect of the invention, a total span about a setpoint temperature is adjusted in accordance with a previous total span and a multiplicative factor. The multiplicative factor is periodically updated from a desired cycle time and a previous cycle time.

With another aspect of the invention, room temperature is controlled by adjusting a duty cycle for controlling an environmental control unit. The duty cycle is adjusted based on an error associated with a previous control cycle, an attenuation factor, and a changing rate.

With another aspect of the invention, a new control cycle may be started by cutting the previous control cycle if a predetermined condition is detected.

With another aspect of the invention, a current control cycle may be extended if a predetermined condition is detected.

With another aspect of the invention, a control mode is selected based on environmental characteristics and room characteristics. The control mode includes a span control mode and a duty cycle control mode that is selected from the cycle rate.

With another aspect of the invention, the number of on-off cycles per a unit time is controlled. Consequently, an approximately constant temperature is achieved.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

DETAILED DESCRIPTION OF INVENTION

Architecture of Cycle Rate Control Algorithm

Figure 1:
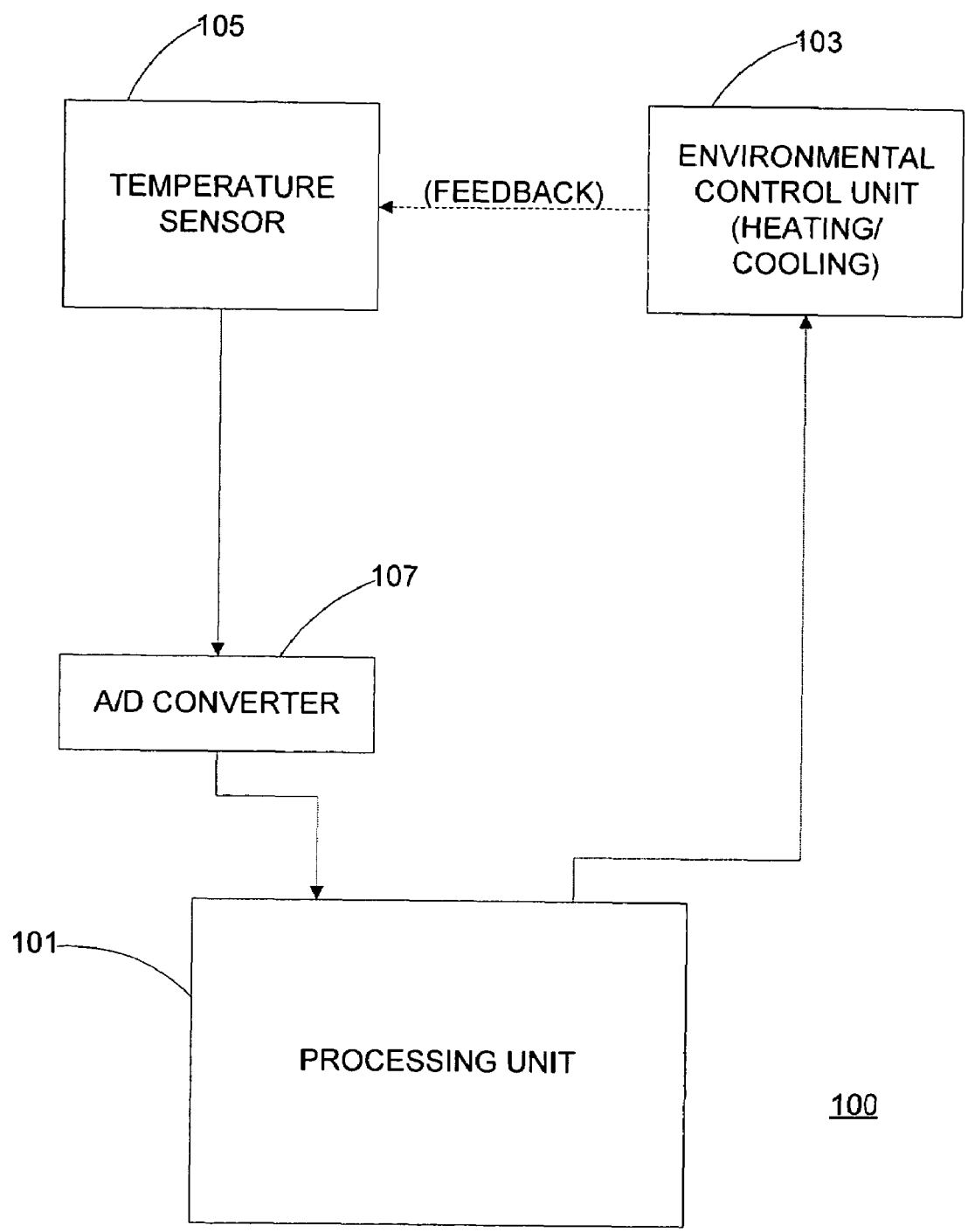
FIG. 1 shows an architecture of an apparatus for controlling a temperature of a room in accordance with an embodiment of the invention.
Figure 2:
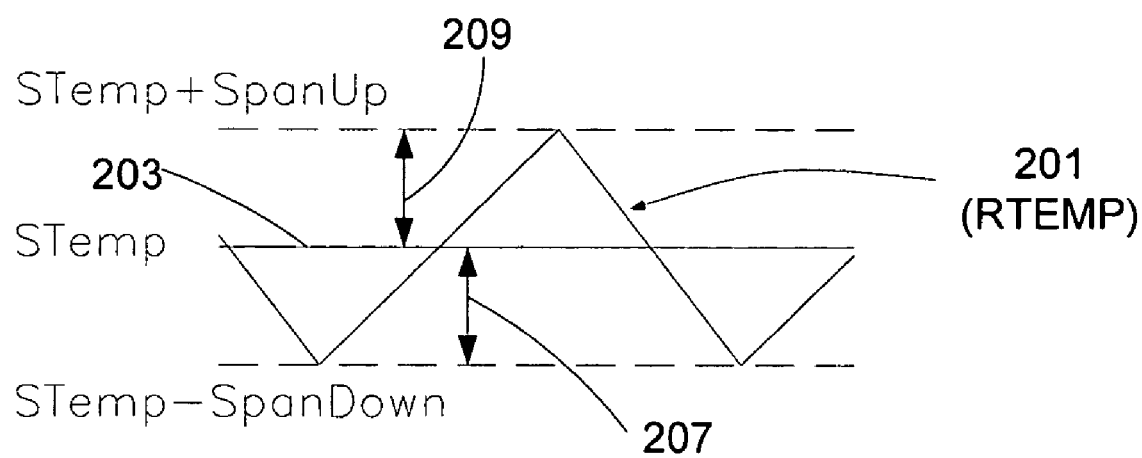
FIG. 2 shows cycle rate control by a variable span in accordance with an embodiment of the invention.

FIG. 1 shows an architecture of an apparatus 100 for controlling a temperature of a room in accordance with an embodiment of the invention. Apparatus comprises processing unit 101, environmental control unit 103, temperature sensor 105, and A/D (analog to digital) converter 107. In the embodiment, processing unit 101 comprises a microprocessor control unit (MCU) that includes a processor and memory that stores computer-executable instructions and data. Environmental control unit 103 may include a furnace to heat the room and/or an air conditioner to cool the room. The embodiment of the invention also supports a heat pump, which provides the functionality of both a furnace and an air conditioner. The embodiment shown in FIG. 1 may support a heating unit and/or a cooling unit. Typically, the cycle rate is also subject to other factors such as short cycle protection delay and start up delay as will discussed with FIGS. 10-19.

Temperature sensor 105 measures the temperature of a room, thus obtaining feedback from environmental control unit 103. A room may assume different entities, including a room in a house, a general location in a house, an office, or an atrium in a building. Temperature sensor 105 typically generates an analog signal that is converted into a digital signal by A/D converter 107. Processing unit 101 processes the digital signal in accordance with a temperature control process, e.g., flow diagrams 10-19 and flow diagrams 20-30 as will be discussed. The process shown in flow diagrams 10-19 enables a user to adjust the system cycle rate. Temperature control accuracy is also enhanced because the process does not depend on "span temperature". A controller supervisor is part of the thermostat software which includes all the I/O (AD, LCD, keyboard, etc.) control and processing as well as the controller (duty cycle control and controller supervisor). This software component runs on processing unit 101.

Embodiment using Variable Span Control and Variable Duty Cycle Control

Referring to an embodiment of the invention as shown in FIGS. 10-19, FIG. 2 shows cycle rate control by a variable span in accordance with an embodiment of the invention. An embodiment of the invention provides a method to adjust a cycle rate for controlling a heating system or cooling system. Consequently, the room temperature may be maintained or controlled. The cycle rate may be specified as the number of control cycles in one hour with a 50% duty cycle. With cycle rate control, the switching frequency of the heating or cooling unit may be precisely controlled. An important function of a thermostat is to maintain the room temperature at the user's desired temperature. Two of the methods that can be used in temperature control are span control and duty cycle control. These two methods can be modified to incorporate cycle rate adjustment.

With span control four variables are defined: STemp 203, RTemp 201, SpanUp 209, and SpanDown 207. STemp 203 represents the desired setpoint temperature. RTemp 201 represents the room temperature. SpanUp 209 is the temperature interval above STemp 203 that the thermostat does not respond to SpanDown 207 is the temperature interval below STemp 203 that the thermostat does not respond to.

For heating control when the outdoor temperature is lower than STemp 203, RTemp 201 rises when the heating system is activated and falls when the heating system is deactivated. The thermostat switches off the heating system when RTemp 201 rises above STemp+SpanUp, and switches on the heating system when RTemp 201 falls below STemp−SpanDown.

Figure 3:
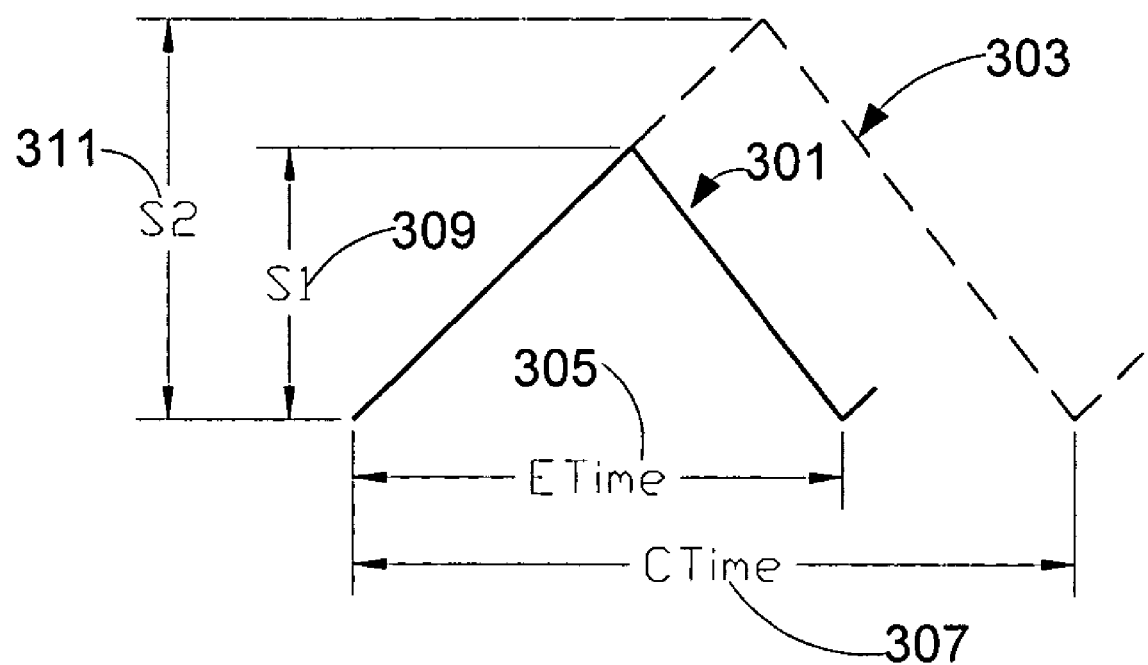
FIG. 3 shows an adjustment of a cycle time by controlling a total span in accordance with an embodiment of the invention.

FIG. 3 shows an adjustment of a cycle time by controlling a total span in accordance with an embodiment of the invention. By controlling SpanUp 209 and SpanDown 207, the cycle rate is adjusted.

During the start of a new control cycle, the time taken in the last control cycle corresponds to ETime 305, and the desired cycle time corresponds to CTime 307. Assume that the room temperature change can be approximated by ramp responses 301 and 303. Then the new total span S2 311 is determined by:

$$k = CTime/ETime \quad (EQ. 1)$$

$$S2 = S1 * k \quad (EQ. 2)$$

where S1 309 is the total span of the last control cycle.

Figure 4:
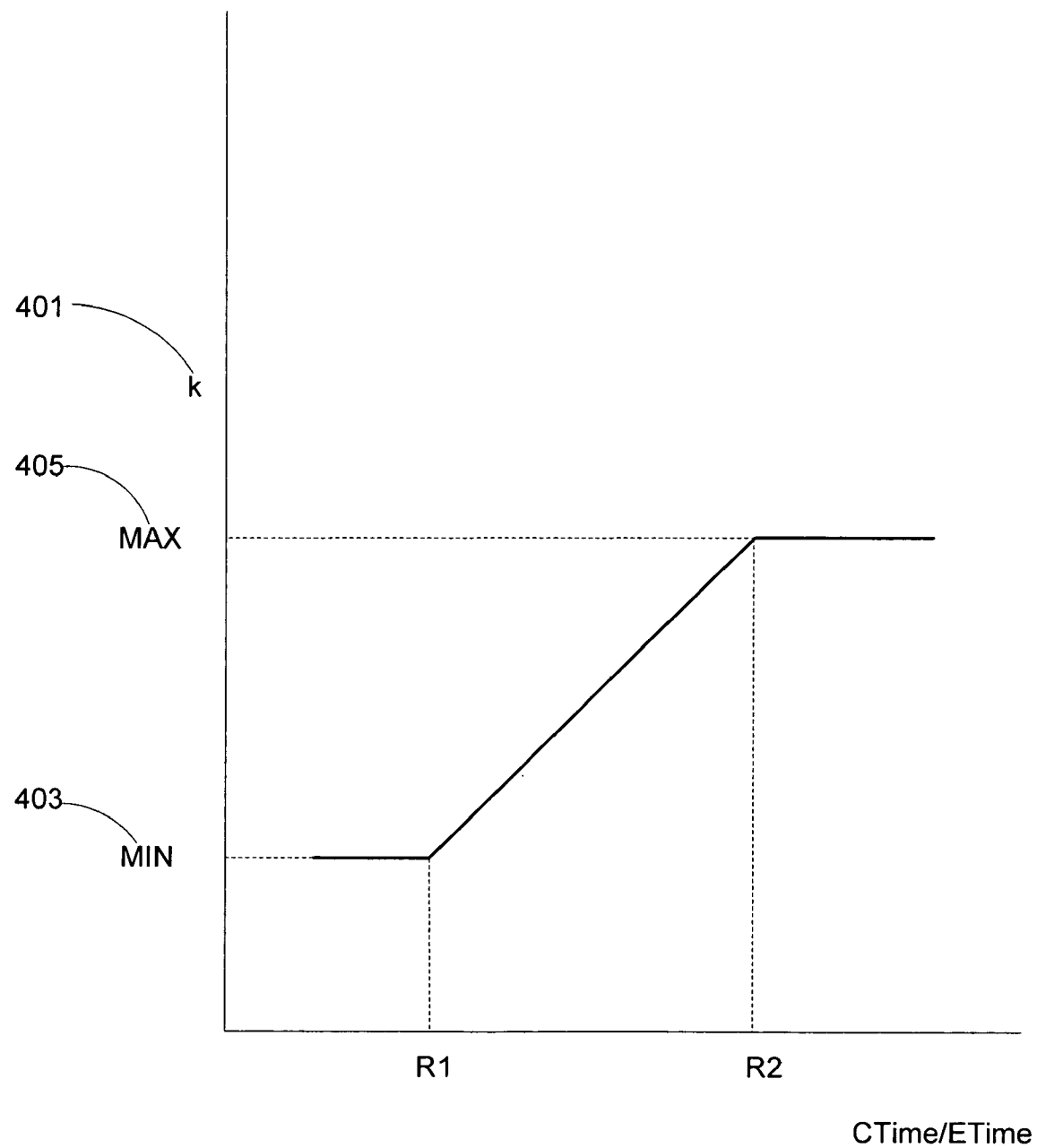
FIG. 4 illustrates limiting a multiplicative factor for controlling a total span in accordance with an embodiment of the invention.

FIG. 4 illustrates limiting a multiplicative factor k 401 for controlling a total span in accordance with an embodiment of the invention. To prevent span changing too fast that may cause unstable, k 401 is limited between 0.5 and 2, corresponding to MIN 403 and MAX 405, respectively. (In the embodiment, the range between 0.5 and 2 may be an initial range and may be adjusted to enhance performance.) Since S2 is the total span, then $$SpanUp = S2/2 \quad (EQ. 3a)$$

$$SpanDown = S2 - SpanUp \quad (EQ. 3b)$$

While EQ. 3a and EQ. 3b assume symmetry about the setpoint temperature, the embodiment of the invention also supports an asymmetric relationship in which SpanDown does not equal SpanUp.

The above discussion illustrates how to adjust span in order to change the cycle time in accordance with an embodiment of the invention. The following points should be considered in a typical system:

- If STemp 203 is changed either manually or automatically (by user program, for example), ETime 305 may not reflect the actual time taken in one cycle. A controller supervisor, which may be implemented as a layer above the basic control process, should recognize this change and stop updating span for two cycles.
- Total span should be a value greater than 0, or preferably greater than 0.1 F. A minimum possible total span is limited by the precision and response of the thermostat and the temperature disturbance.
- Short cycle protection and/or minimum cycle time requirements should be met before starts up of a new control cycle.
- The process can also be applied on a cooling system with reversed control.

Figure 5:
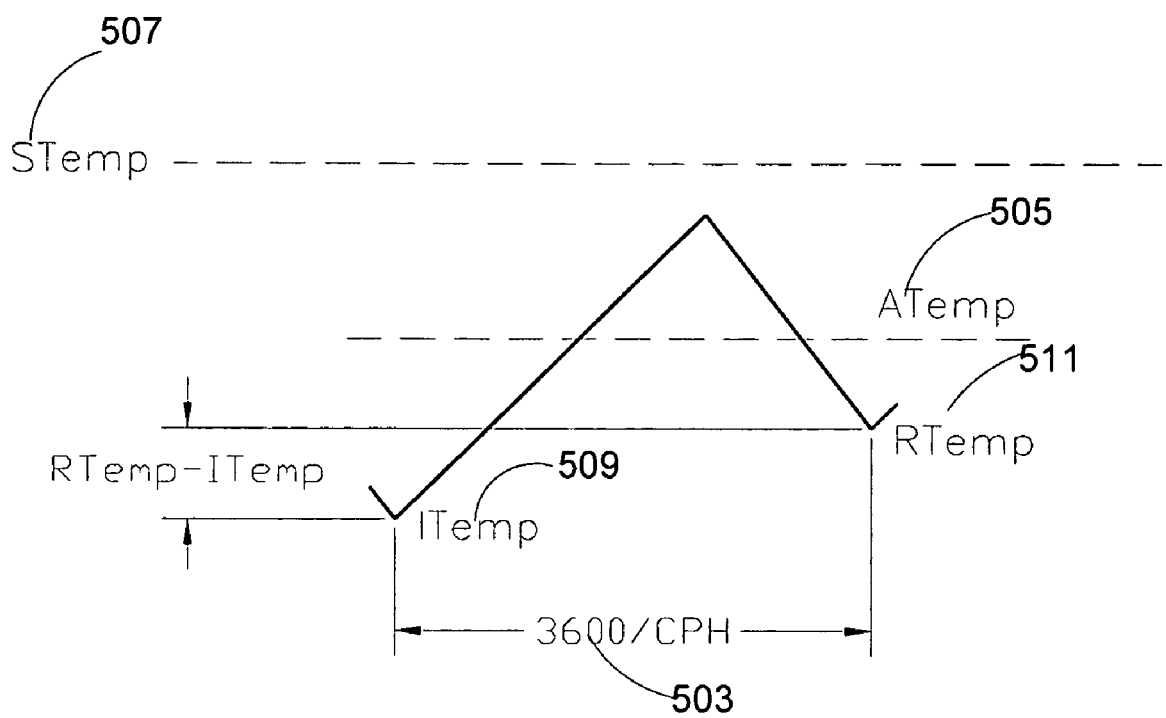
FIG. 5 shows cycle rate control by determining an error used for adjusting duty cycle in accordance with an embodiment of the invention.

FIG. 5 shows cycle rate control by determining an error used for adjusting duty cycle in accordance with an embodiment of the invention. When the required cycle rate is large (e.g., 4 CPH or larger), the total span becomes small so that the thermostat may not detect the small temperature change accurately, and consequently cycle rate control may become difficult. Variable duty cycle control does not depend on determining an accurate total span and is more suitable with a higher cycling rate.

With variable duty cycle control, cycle rate is independent of the room temperature change. The duty cycle is adjusted to control and maintain the room temperature at the desired level. During the start of a new control cycle, ATemp 505 is the average temperature of the previous control cycle, ITemp 509 is the initial room temperature of the previous control cycle, RTemp 511 is the current room temperature, STemp 507 is the desired setpoint temperature, and CPH is the cycle per hour setting that corresponds to the cycle time duration 903 (3600/CPH) of the previous control cycle.

The error E2 of the predicted temperature and STemp may be expressed as:

$$E2 = STemp - (ATemp + (floor(CPH/2)+1)*(RTemp - ITemp)) \quad (EQ. 4)$$

where floor(X) is a function that rounds down the variable X to the nearest integer.

In EQ. 4, (Rtemp−Itemp) is the temperature change during the previous control cycle. The temperature change is then multiplied by a factor that is dependent of the CPH. This factor is used to amplify the small temperature change during large cycle rate. The predicted temperature is the sum of the average temperature and the temperature change. The temperature error E2 is then attenuated by a gain G to obtain an attenuated error:

$$d2=E2*G \quad (EQ. 5)$$

G is a value that is typically equal to 0.0625 but can be adjusted to suit other situations. For example, if the temperature response is very fast (corresponding to a powerful heating or cooling plant in a small room), it may be necessary to reduce G.

The duty cycle (Duty_Cycle) can be modified by d2. For a cooling system:

$$Duty\_Cycle=Duty\_Cycle-d2 \quad (EQ. 6a)$$

For a heating system:

$$Duty\_Cycle=Duty\_Cycle+d2 \quad (EQ. 6b)$$

To prevent short turn on or turn off time, if Duty_Cycle is larger than a certain value, e.g., 0.9375, then Duty_Cycle is set to 1.0000 for a full turn-on during the control cycle. Similarly, if Duty_Cycle is smaller than a certain value, e.g., 0.0625, then Duty_Cycle is set to 0.0000 for a full turn-off during the control cycle.

The turn-on time, OnTime, is equal to:

$$OnTime=Duty\_Cycle*CTime \quad (EQ. 7)$$

where CTime is the cycle time (3600/CPH).

Typically, short cycle protection and/or minimum cycle time requirements may be met before a new control cycle starts. The cycle rate may be lower than the setting if the duty cycle is large.

As previously mentioned, FIGS. 10-19 show an embodiment of the invention that utilizes both variable span control and variable duty cycle control. Another embodiment of the invention, as shown in FIGS. 20-30, utilizes only variable duty cycle control.

Figure 10:
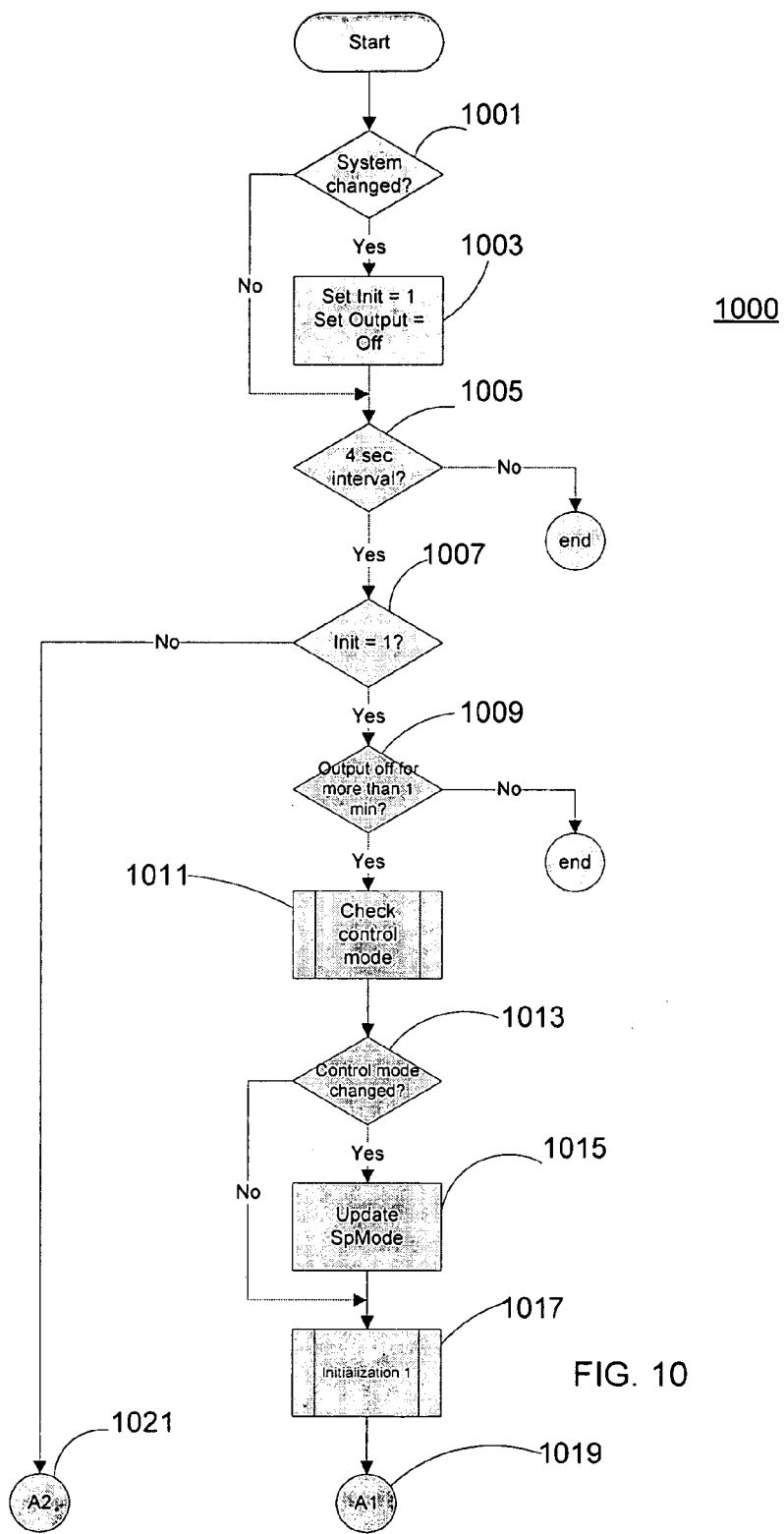
FIGS. 10-19 show a flow diagram for a cycle rate control process in accordance with an embodiment of the invention.
Figure 11:
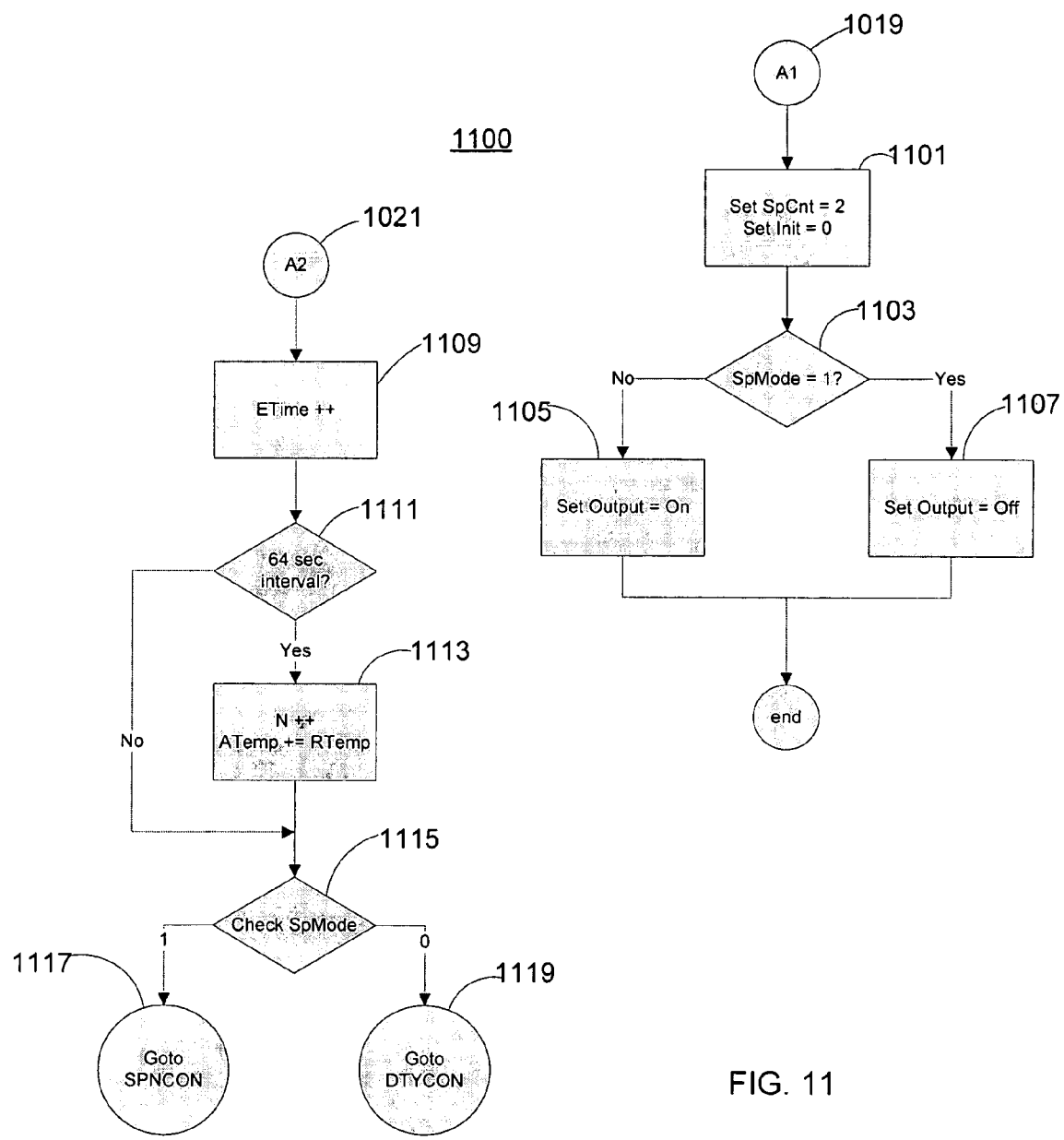
Figure 16:
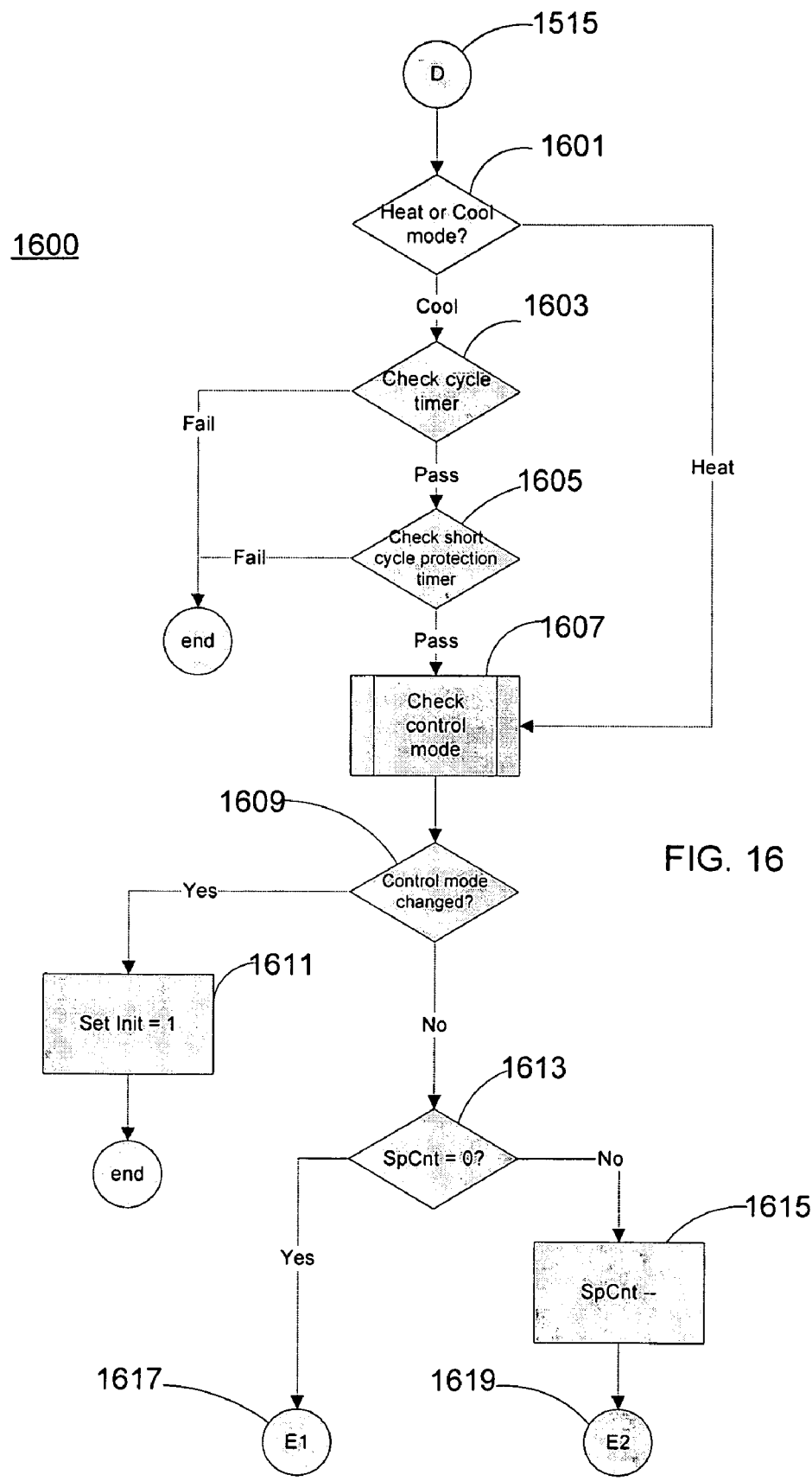
Figure 17:
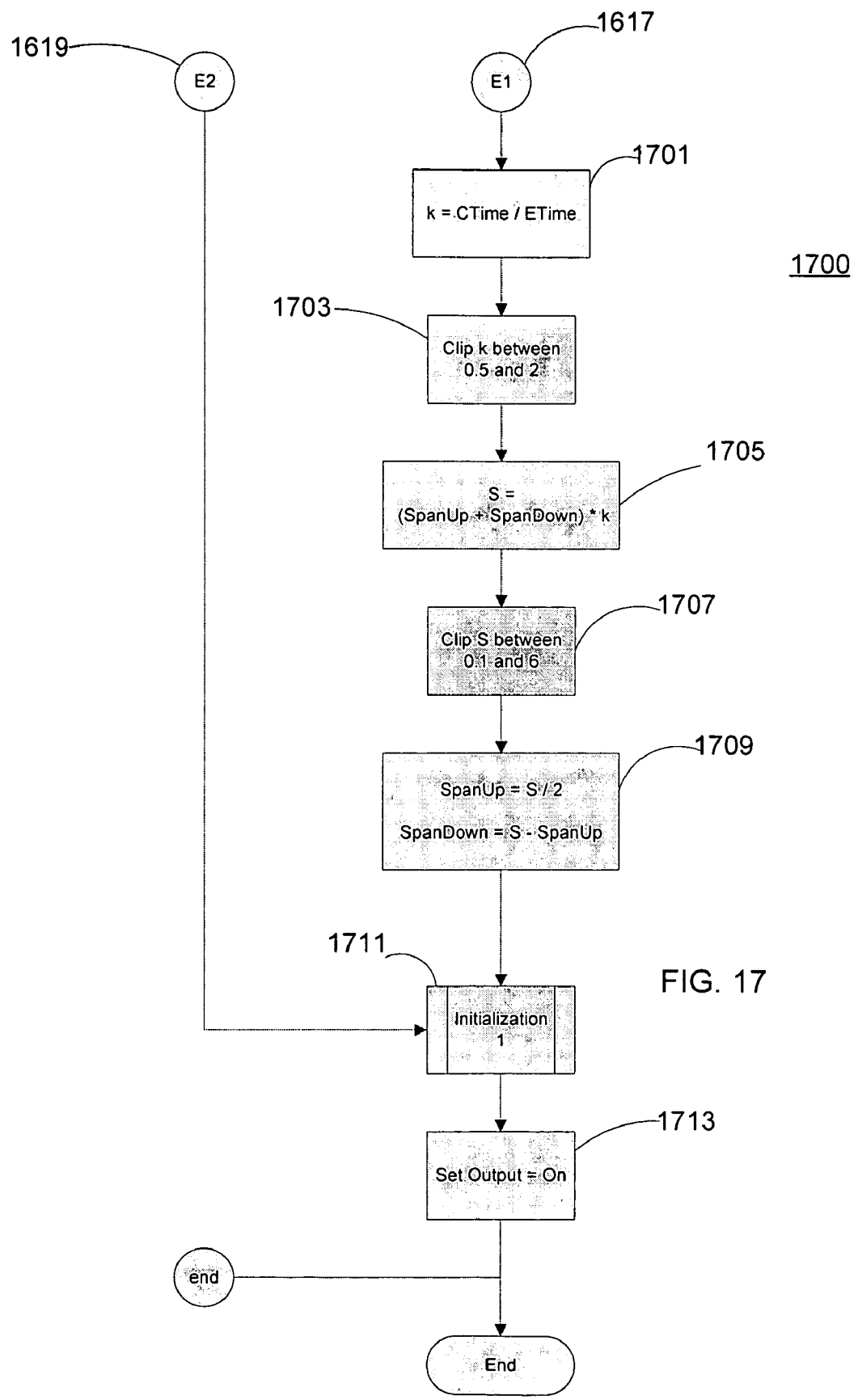
Figure 18:
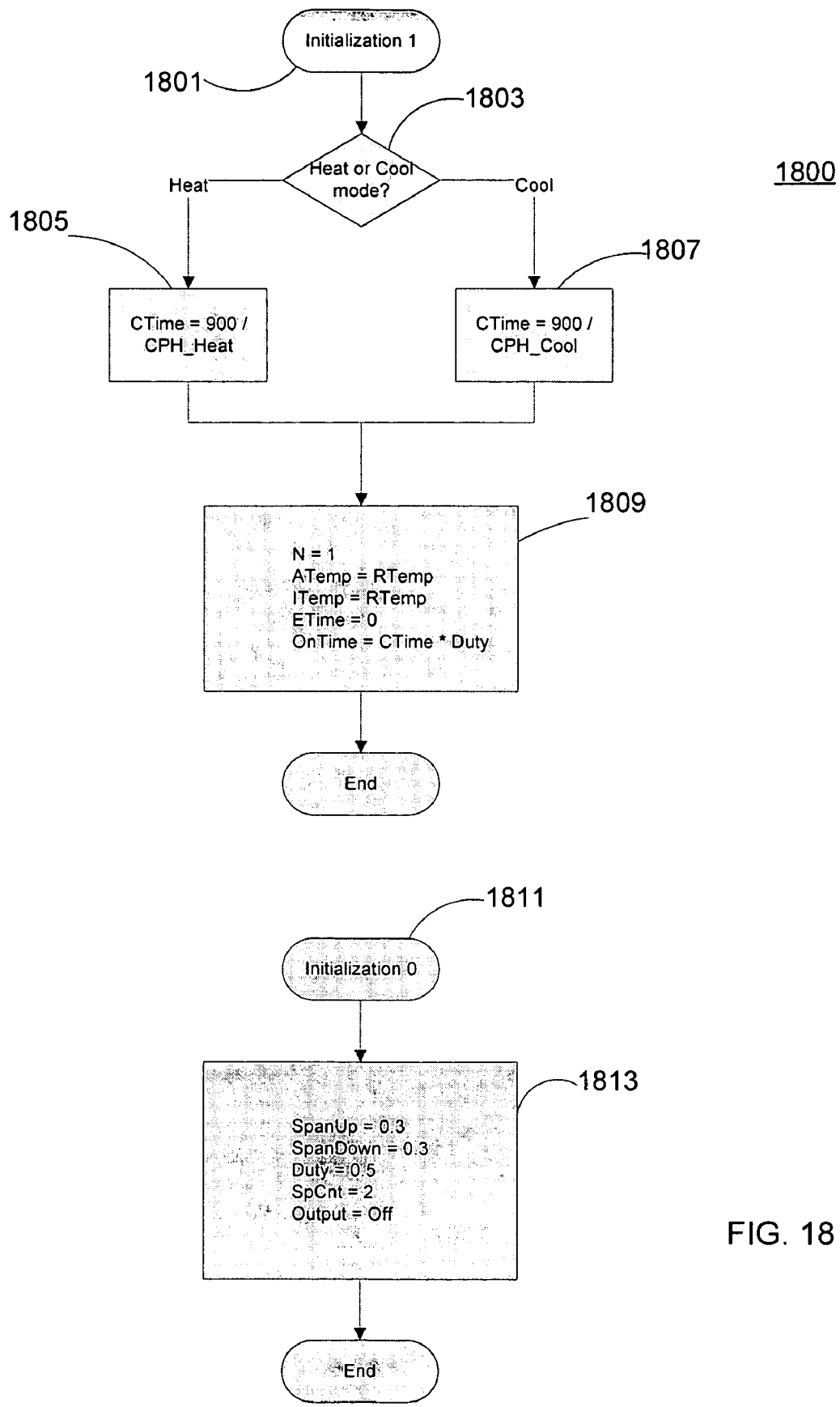

FIGS. 10-19 show a flow diagram for a cycle rate control procedure in accordance with an embodiment of the invention. FIG. 10 shows flow diagram 1000 corresponding to a cycle rate control procedure that is performed during a control cycle in accordance with an embodiment of the invention. Flow diagram 1000 is started at the beginning of a control cycle. Steps 1001-1007 determine whether to initialize the apparatus (e.g., apparatus 100 as shown in FIG. 1). If so, steps 1009-1017 are executed. In step 1003, setting flag Init=1 resets the temperature control process. Additionally, flag Init may be externally reset. In step 1005, cycle rate control operates every 4 seconds, although the embodiment may operate at different time intervals. With step 1009, the control output turns off for at least 1 minute after each initialization. Step 1011 checks the control mode, which is either the span control mode or the duty cycle control mode depends on the value of CPH, and step 1013 determines whether the control mode has changed. With step 1017, the initialization process is executed as shown in FIG. 18 as steps 1801-1809. Steps 1019 and 1101-1107 (as shown in FIG. 11) are subsequently executed. If step 1007 determines that initialization is not to be executed, then steps 1021 and 1109-1119 are executed (as shown in FIG. 11). When executing steps 1109-1119, either the span control mode or the duty cycle control mode may be performed as will be discussed.

FIG. 11 shows flow diagram 1100, which is a continuation of flow diagram 1000 that is shown in FIG. 10. As previously discussed, steps 1019 and 1101-1107 are executed if initialization is to be performed. If initialization is not to be performed, then steps 1021 and 1109-1119 are executed. In step 1109, counter ETime (corresponding to ETime 305 as shown in FIG. 3 is incremented. (Counter ETime measures the elapsed time since the start of the control cycle.) In step 1113, counter N is updated every 64 seconds (as determined by step 1111) so that the average temperature ATemp 505 (as shown in FIG. 5) can be determined during the control cycle. (ATemp may be used only in duty cycle control. ATemp sums up RTemp every 64 sec. Average temperature is calculated when a new cycle is going to be started, where the average temperature=ATemp/N.) Step 1115 checks SpMode. If SpMode=1, apparatus 100 is operating in the span control mode. If SpMode=0, then apparatus 100 is operating in the duty cycle control mode.

Figure 12:
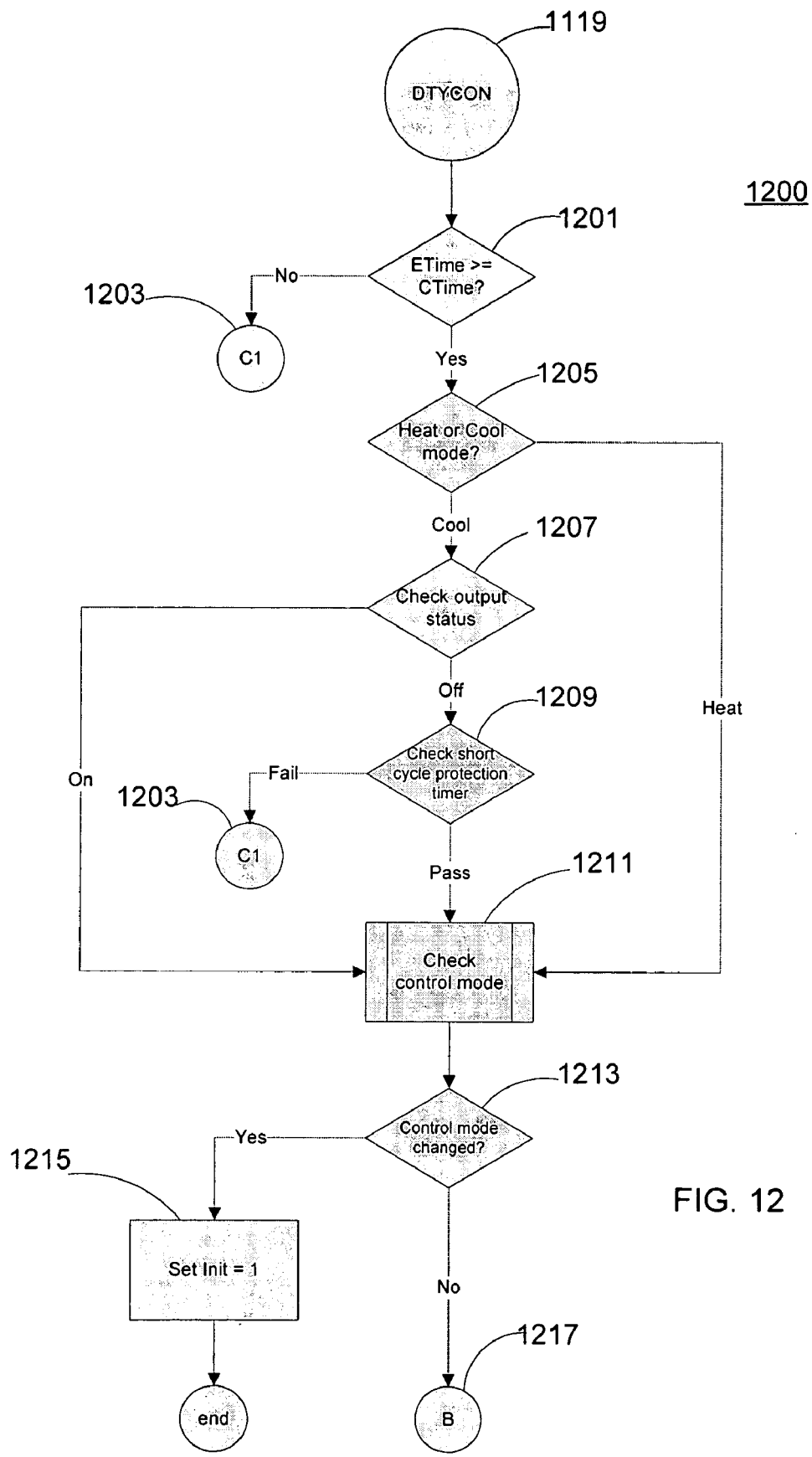
Figure 19:
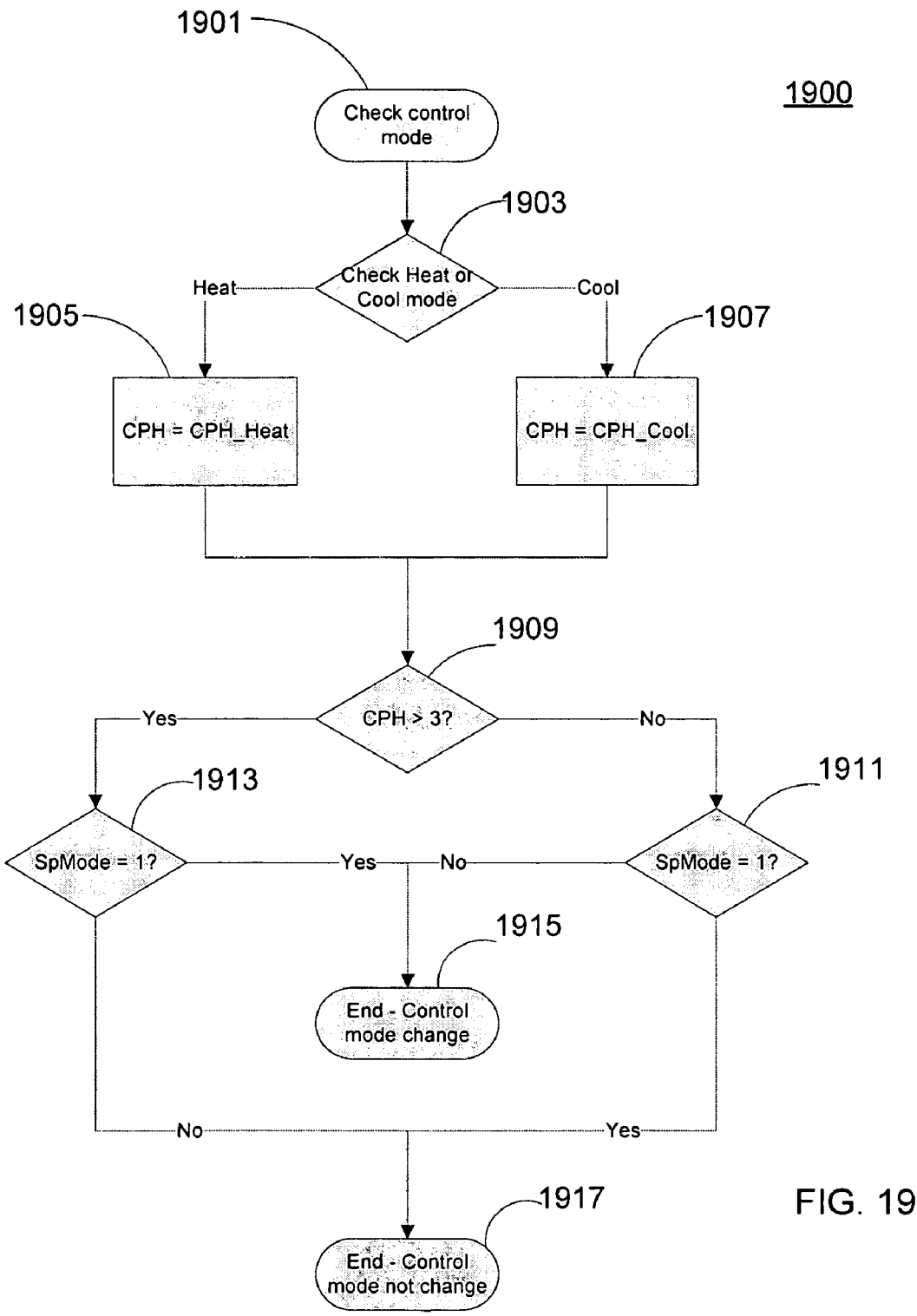

FIG. 12 shows flow diagram 1200 for controlling a duty cycle in accordance with an embodiment of the invention. Steps 1119 and 1201-1217 are executed if SpMode=0 as previously discussed. In step 1201, ETime (as updated by step 1109 in FIG. 11) is compared with CTime. (CTime is the time of the on or off period. It depends on the CPH setting and the duty cycle.) If ETime is less than CTime, steps 1203 and 1403-1407 (as shown in FIG. 14) are executed. Otherwise, steps 1205-1213 are executed. Steps 1205-1213 are used to check if it can start a new on cycle in cooling mode. For cooling mode there is short cycle protection timer which limits the minimum turn off time. In step 1211, the control mode is checked as performed by steps 1901-1917 as shown in FIG. 19. If step 1213 determines that the control mode has changed, then flag Init is set to '1' in step 1215. Otherwise, steps 1217 and 1301-1317 are executed as will be discussed in FIG. 13.

Figure 13:
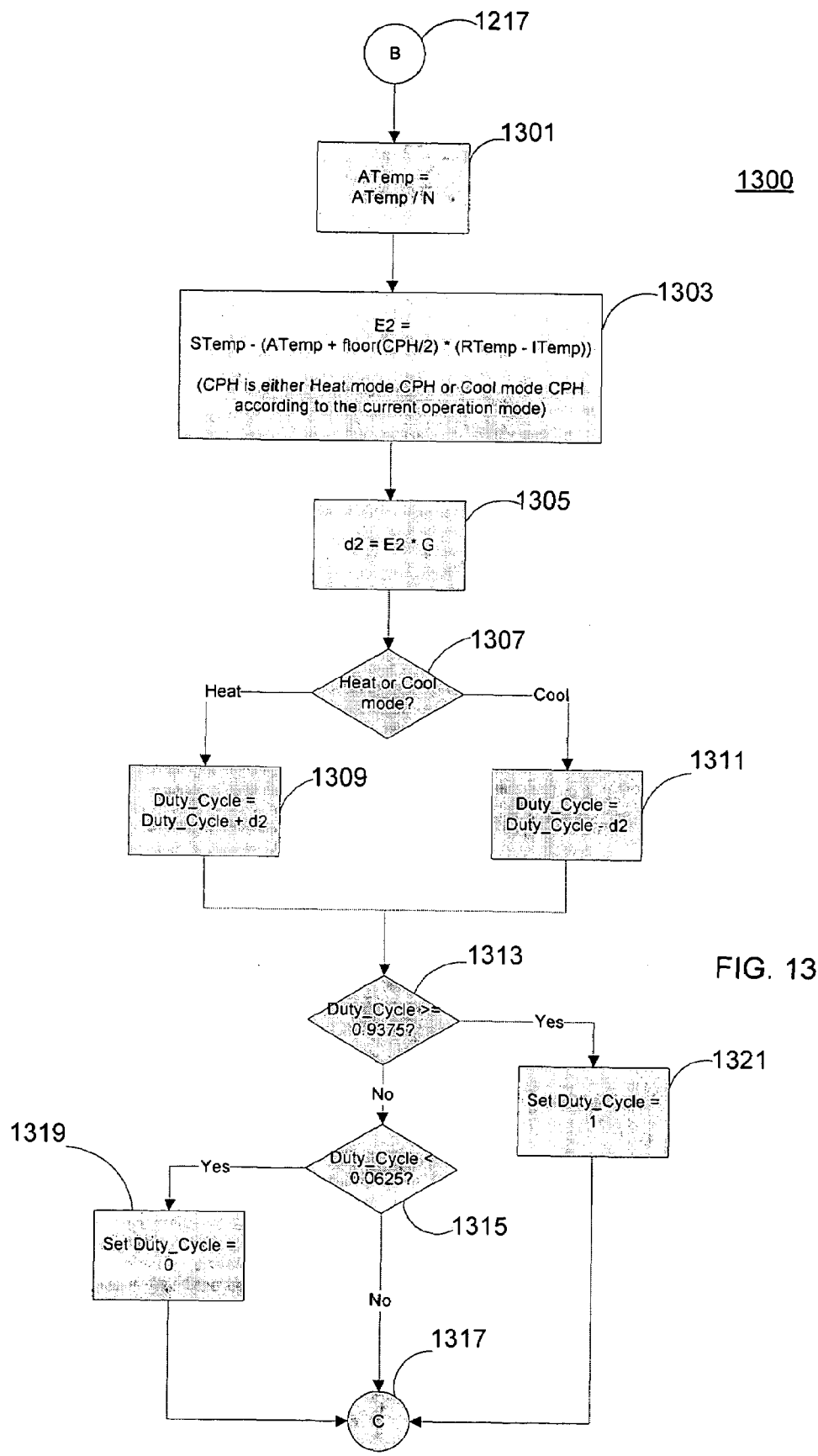
Figure 14:
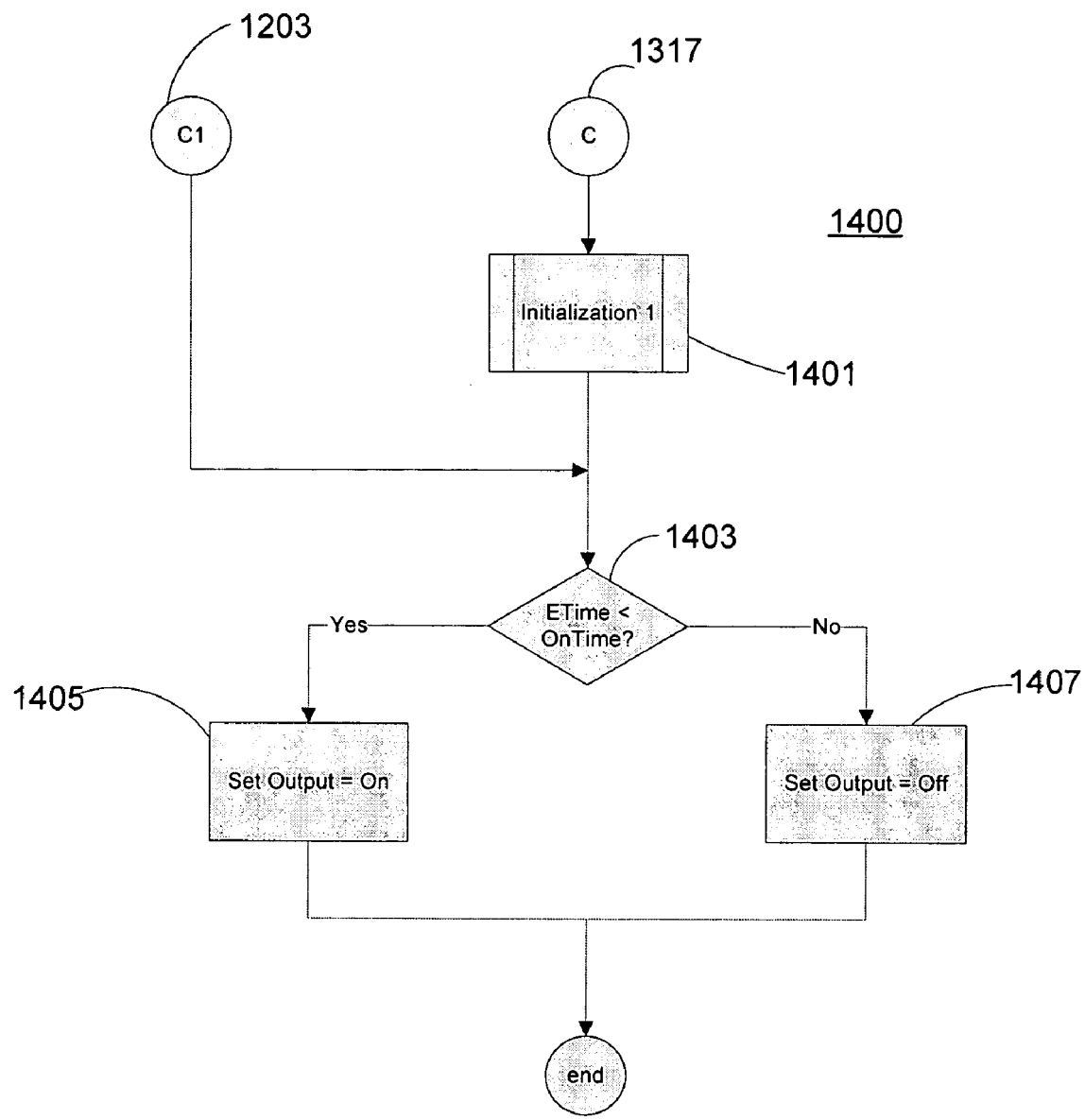

FIG. 13 shows flow diagram 1300, which is a continuation of flow diagram 1200 that is shown in FIG. 12. In step 1301, the average temperature ATemp 905 is determined. In step 1303, error E2 is determined in accordance with EQ 4. In step 1305, the attenuated error d2 is determined in accordance with EQ. 5, and Duty_Cycle is updated in steps 1309 or 1311 in accordance with EQ. 6a or EQ. 6b. G is the controller gain and may be user adjustable. Steps 1313-1315 determine whether Duty_Cycle is too small or too large and set Duty_Cycle accordingly in steps 1319 or 1321.

FIG. 14 shows flow diagram 1400, which is a continuation of the flow diagrams 1200 and 1300 that are shown in FIGS. 12 and 13. Steps 1401-1407 are performed if either steps 1203 or 1317 are executed. Step 1203 is executed if the current cycle is continued, and step 1317 is executed if a new cycle is started. In step 1403, if ETime is less than OnTime, then the control output is set to 'ON' in step 1405. Otherwise, the control output is set to 'OFF' in step 1407. (OnTime is determined in step 1809 as shown in FIG. 18.)

Figure 15:
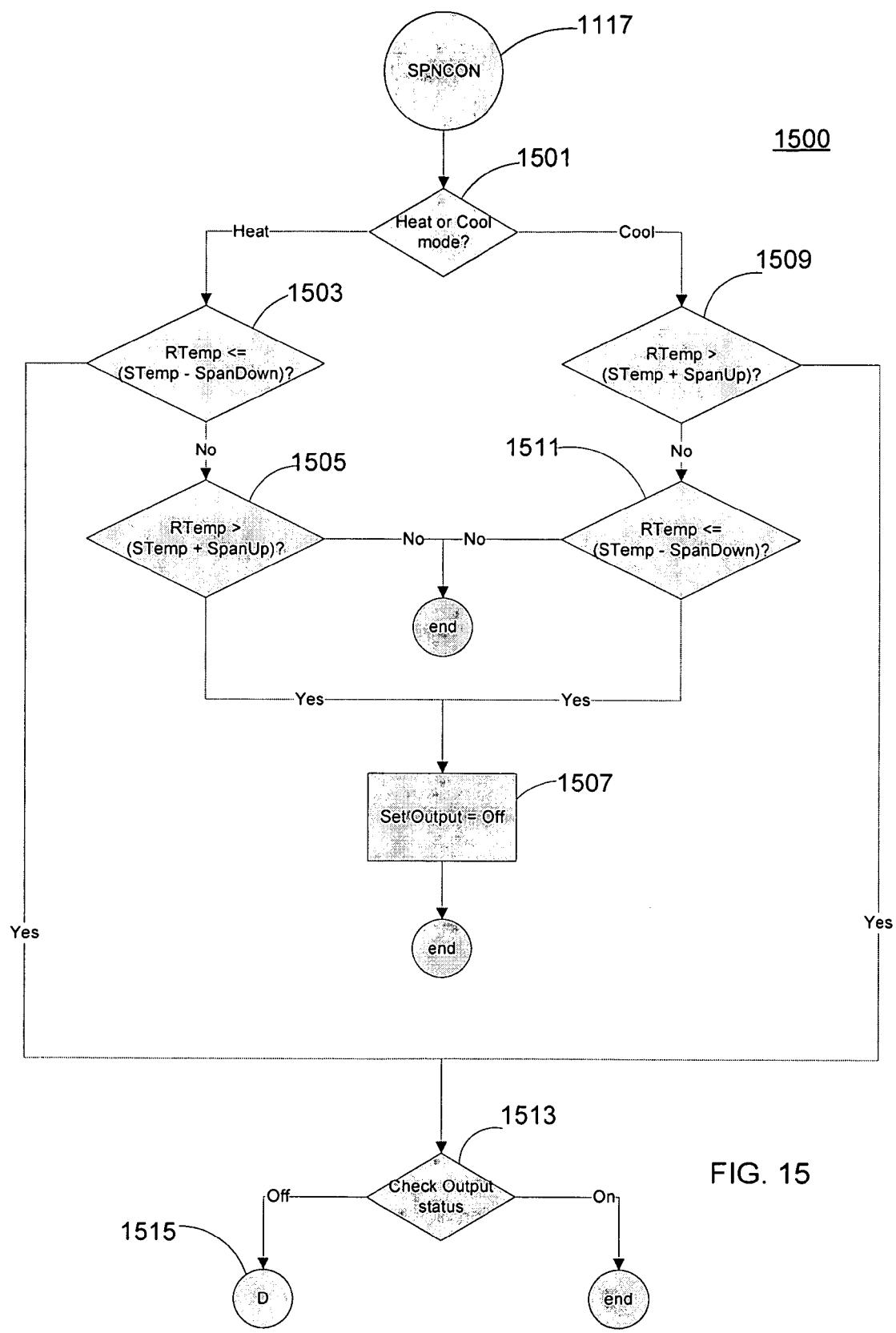

FIG. 15 shows flow diagram 1500 for controlling a total span in accordance with an embodiment of the invention. Steps 1501-1515 are executed if the control mode equals the span control mode. Steps 1503-1505 and 1509-1511 determine if the current temperature RTemp is within a specified temperature range.

FIG. 16 shows flow diagram 1600, which is a continuation of flow diagram 1500 that is shown in FIG. 15. Steps 1601-1619 are executed only if a new cycle is to be started, i.e., the output needs to be changed from off to on. In heat mode it means that the room temp drops below STemp−SpanDown and output is off. In the cool mode it means that the room temp rises over STemp+SpanUp and output is off. As determined by step 1613, step 1617 is executed if SpCnt equals 0. Otherwise, SpCnt is decremented in step 1615 and step 1619 is executed. SpCnt can be set externally, e.g., after a change of STemp. Steps 1711-1713 are performed if either step 1617 or step 1619 is executed. SpCnt is set externally to non-zero value to hold the current SpanUp and SpanDown. With some conditions (e.g., where STemp is changed) the current parameters are held for a few cycles for it to stabilize.]

FIG. 17 shows flow diagram 1700, which is a continuation of flow diagrams 1600 and 1700 that are shown in FIGS. 15 and 16. If step 1617 is executed, steps 1701-1709 are performed, corresponding to EQ. 1, EQ. 2, EQ. 3a, and EQ. 3b. In steps 1701-1709, SpCnt=0 and consequently SpanUp and SpanDown are adjusted for the new cycle.

FIG. 18 shows flow diagram 1800 for initializing the procedures shown in FIGS. 10-17. Initialization process 1801 includes steps 1803-1809. Initialization process 1801 initializes variables during the start of each control cycle. Initialization process 1811 includes step 1813. Initialization process 1811 sets parameters to default values during system start up.

FIG. 19 shows flow diagram 1900 for checking the control mode in accordance with an embodiment of the invention. Steps 1903-1917 determine whether the control mode should be changed. In the embodiment, when the cycle rate is less than or equal to 3, the control mode is equal to the span control mode. When the cycle rate is greater than or equal to 4, the control mode is equal to the duty cycle control mode. In steps 1905 and 1907, CPH_Heat and CPH_Cool are the setting values of the cycle rate in the heating mode and the cooling mode, respectively. If flow diagram 1900 determines to change the control mode, then step 1915 is executed. Otherwise, step 1917 is executed.

Embodiment Using Only Variable Duty Cycle Control

Referring to an embodiment of the invention as shown in FIGS. 20-30, the heating duty cycle may be adjusted to control the room temperature at different conditions. The duty cycle is related to the current room temperature, setpoint temperature and room temperature changing rate. In the following discussion, the following variables e (proportional error), r (rate error), and d (duty cycle) are defined as:

$e$ = room temperature−setpoint temperature (EQ. 8a)

$r$ = room temperature changed in a specific time (EQ. 8b)

$d$ = duty cycle (0-1:0=always off, 1=always on) (EQ. 8c)

where $d = F[e, r]$ (EQ. 8d)

The duty cycle (d) is determined according to the following observations:

When e is positive for a heating system, i.e., the room temperature is higher than the setpoint temperature, then the duty cycle d should be decreased to lower the room temperature.

When r is positive for a heating system, i.e., the room temperature is rising, then the duty cycle d should be decreased to stop the temperature changing.

The above variables are expressed as sampled functions in time n, where $e_n = K1*(TA_n - TS_n)$ (EQ. 9a)

$r_n = K2*(TA_n - TA_{n-1})/[(tC_n + tC_{n-1})/2]$ (EQ. 9b)

$d_{n+1} = d_n - e_n - r_n$ (EQ. 9c)

where

K1 is a gain constant of proportional error control.
K2 is a gain constant of rate error control.

TA is an average room temperature in an on or off cycle.
TS is a setpoint temperature.
tC is a cycle time in an on or off cycle.
d is the duty cycle.
$(TA_n - TS_n)$ is the temperature error in the nth on or off cycle.
$(TA_n - TA_{n-1})/[(tC_n + tC_{n-1})/2]$ is the rate of change of room temperature in the period from $(n-1)^{th}$ to $n^{th}$ on or off cycle.
$d_{n+1}$ is the prediction of the next (n+1) duty cycle according to current duty cycle value, $e_n$ and $r_n$.

Duty cycle d and CPH (control cycles per hour) are used to find the turn-on time or turn-off time of the next control cycle. To prevent short turn-on or turn-off time, the minimum turn-on time or turn-off time is defined as the half of the design cycle time and Km, where Km is related to the duty cycle d. If d is smaller than 0.5, $Km = 0.5 + d$ (EQ. 10a)

If d is larger than 0.5, $Km = 1.5 - d$ (EQ. 10b)

In both cases, Km is maximum (=1) when d=0.5, and decrease to minimum (=0.5) when d is decreased to 0 or increased to 1. ("Cycle" denotes a complete on-off cycle. "On cycle" denotes the turn-on period and "off cycle" denotes the turn-off period.)

Table 1 lists the relationship between CPH settings and ½ Design cycle time:

TABLE 1

| Cycle rate setting (CPH) | ½ Design cycle time = 1800/CPH(sec) |
|---|---|
| 1 | 1800 |
| 2 | 900 |
| 3 | 600 |
| 4 | 450 |
| 5 | 360 |
| 6 | 300 |
| 7 | 257 |
| 8 | 225 |
| 9 | 200 |

The on cycle time may be consequently determined. If d is smaller than 0.5 (i.e., system turn-on time is shorter than turn-off time), then Turn-on time = $Km*1800/CPH$ (EQ. 11a)

Turn-on time = $Km*(1800/CPH)*((1/d)-1)$ (EQ. 11b)

where Km = 0.5 + d

If d is larger than 0.5, i.e., system turn-on time is longer than turn-off time, then Turn-on time = $Km*(1800/CPH)*((1/(1-d))-1)$ (EQ. 12a)

Turn-on time = $Km*1800/CPH$ (EQ. 12b)

where Km = 1.5 − d

In both of the above cases:

Turn-on time/(Turn-on time+Turn-off time) = $d$ (EQ. 13)

In other words, the duty cycle does not change.

Also, one notes that the cycle rate is a function of duty cycle as well as CPH.

When d<0.5:

$$\text{Cycle rate} = 2*d*CPH/Km \quad \text{(EQ. 14a)}$$

When d>0.5:

$$\text{Cycle rate} = 2*(1-d)*CPH/Km \quad \text{(EQ. 14b)}$$

When d=0.5, the cycle rate equals the design cycle rate. When d approaches 0 or 1, the cycle rate approaches zero. When d is not equal to 0.5, the cycle rate decreases. Table 2 shows the relationship between duty cycle and cycle rate for the above equations.

The designed cycle rate is the cycle rate at which duty cycle=0.5 (balanced on and off times). It is also the cycle rate in accordance with the user input. For example, when the user sets CPH to 5, it means the designed cycle rate is 5. One can expect there will be 5 cycles on and off in an hour only if the duty cycle through out the hour is 0.5. For the above example if the duty cycle is only 0.2 then the cycle rate will drop to 2.85 (0.57*5), i.e., only 2.85 on-off cycles in an hour. However, in embodiments of the invention, one may configure the system so that the cycle rate is independent to the duty cycle.

TABLE 2

| Duty cycle | Cycle rate |
| --- | --- |
| 0.0 | 0 CPH |
| 0.1 | 0.33 CPH |
| 0.2 | 0.57 CPH |
| 0.3 | 0.75 CPH |
| 0.4 | 0.89 CPH |
| 0.5 | 1.0 CPH |
| 0.6 | 0.89 CPH |
| 0.7 | 0.75 CPH |
| 0.8 | 0.57 CPH |
| 0.9 | 0.33 CPH |
| 1.0 | 0 CPH |

The control of the duty cycle may be relatively slow for certain conditions. An example occurs when a user changes the set temperature and the duty cycle needs to substantially change to obtain the new set temperature. e.g., when a user changes the set temperature. An additional layer, referred as the controller supervisor, is built on top of the basic duty cycle control process. The controller supervisor detects these changes and assists the basic duty cycle control process to achieve the new set temperature in a shorter period of time by "cycle cut" or "extend" as will be discussed. Another function of the controller supervisor is to ensure that the temperature does not vary too far away from the set temperature by bounding the temperature between "upper limit" and "lower limit" (similar to span control as previously discussed). This is a safety feature to ensure the stability of duty cycle control.

Figure 6A:
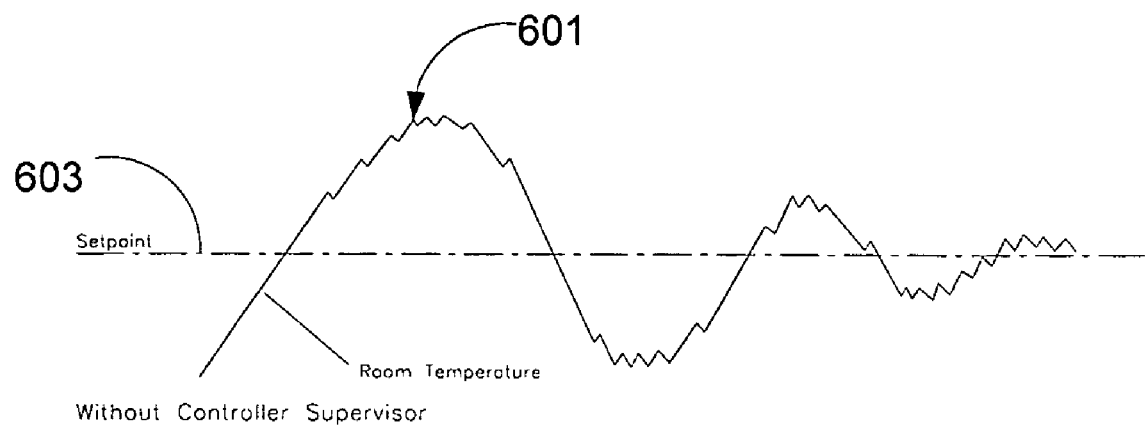
FIG. 6A shows a variation of room temperature without a controller supervisor in accordance with an embodiment of the invention.

FIG. 6A shows a variation of room temperature 601 without a controller supervisor. Room temperature 601 is controlled with respect to setpoint temperature 603. The variability of room temperature 601 is not tightly controlled below or above setpoint temperature 603 even though room temperature 601 is approximately centered about setpoint temperature 603.

Figure 6B:
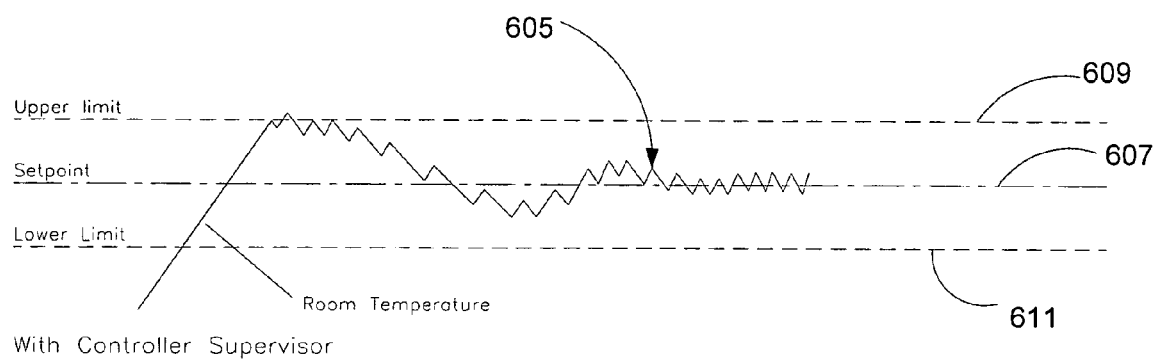
FIG. 6B shows a variation of room temperature with a controller supervisor in accordance with an embodiment of the invention.

FIG. 6B shows a variation of room temperature 605 with a controller supervisor in accordance with an embodiment of the invention. Control of room temperature 605 is specified with respect to setpoint temperature 607, upper limit 609, and lower limit 611. The temperature difference corresponding to upper limit 609 minus lower limit 611 may be referred as the total span.

One consideration when designing a temperature controller is the unknown of the response of the plant (e.g., a room) to be controlled. Gain constants (e.g., K1 and K2 as was discussed) adjust the temperature controller response and stability. For some systems, a large gain constant value is required to prevent slow control response. However, in some systems, a small gain constant is necessary to ensure stable operation.

In an embodiment of the invention, a controller supervisor confines the room temperature within two temperature limits: upper limit 609, which is higher than the setpoint temperature, and lower limit 611, which is lower than the setpoint temperature. When room temperature 605 is within the band, the basic duty cycle control process has the full control of room temperature. When the room temperature exceeds the band, the controller supervisor takes control of the system or makes an adjustment to the controller to try to force it back into the band.

Figure 7:
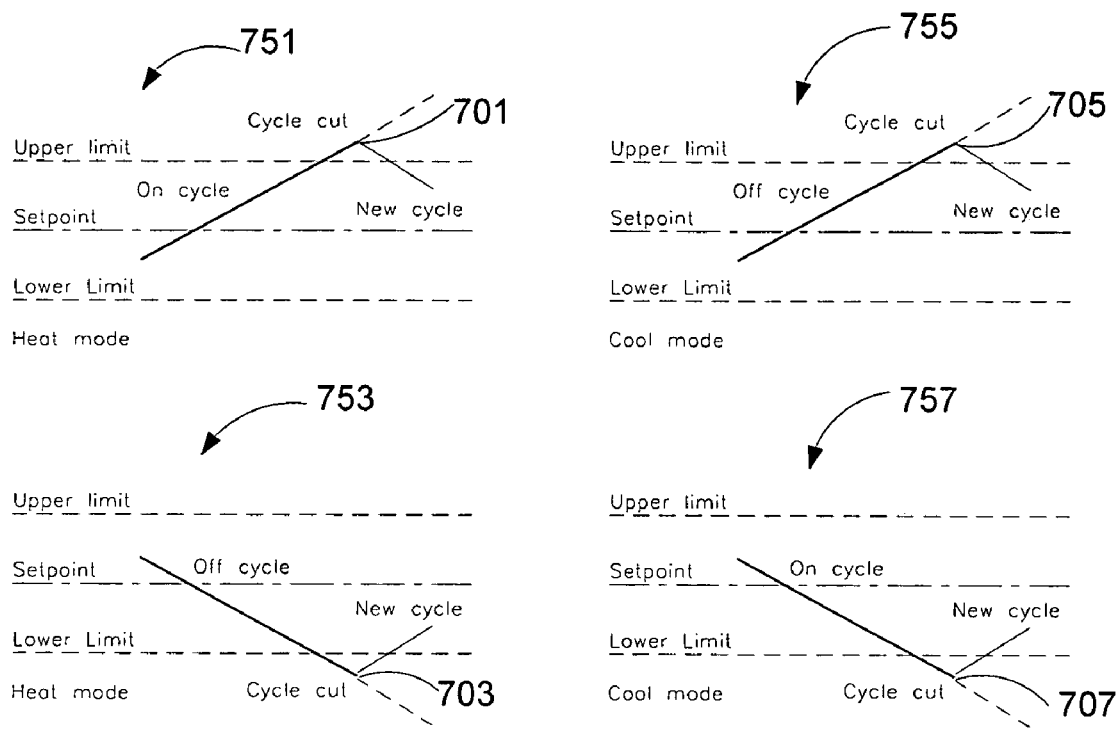
FIG. 7 illustrates cycle cut capability in accordance with an embodiment of the invention.

FIG. 7 illustrates a cycle cut capability in accordance with an embodiment of the invention. The controller supervisor continuously checks conditions 751, 753, 755, and 757 for both the heating mode and the cooling mode. If met, the controller supervisor terminates the current control cycle and starts a new control cycle immediately. (The beginning of the new control cycle corresponds to temperature points 701, 703, 705, and 707.) Since the control output is reversed at the start of next control cycle, the room temperature changes to correct the direction of the room temperature.

The controller supervisor also monitors the required minimum cycle time before cycle cut (to prevent short cycle operation). When starting a new control cycle with the cycle cut capability, the current duty cycle may be far away from the steady state. The controller supervisor can adjust the duty cycle accordingly so that the duty cycle controller can reach steady state in a shorter time. The following pseudo code corresponds to a procedure that supports the cycle cut capability.

```
if      {   [ (Heat mode) and (Output On) and (RTemp>Upper Limit) ]
        or  [ (Heat mode) and (Output Off) and (RTemp<Lower Limit) ]
        or  [ (Cool mode) and (Output Off) and (RTemp>Upper Limit) ]
        or  [ (Cool mode) and (Output On) and (RTemp<Lower Limit) ]
        }
        and
        {   pass all cycle time check
        }
then
            if          {                       Output On
                        }
            then
                                                decrease duty cycle
            else
                                                increase duty cycle
            endif
            Starts new cycle
endif
```

Figure 8:
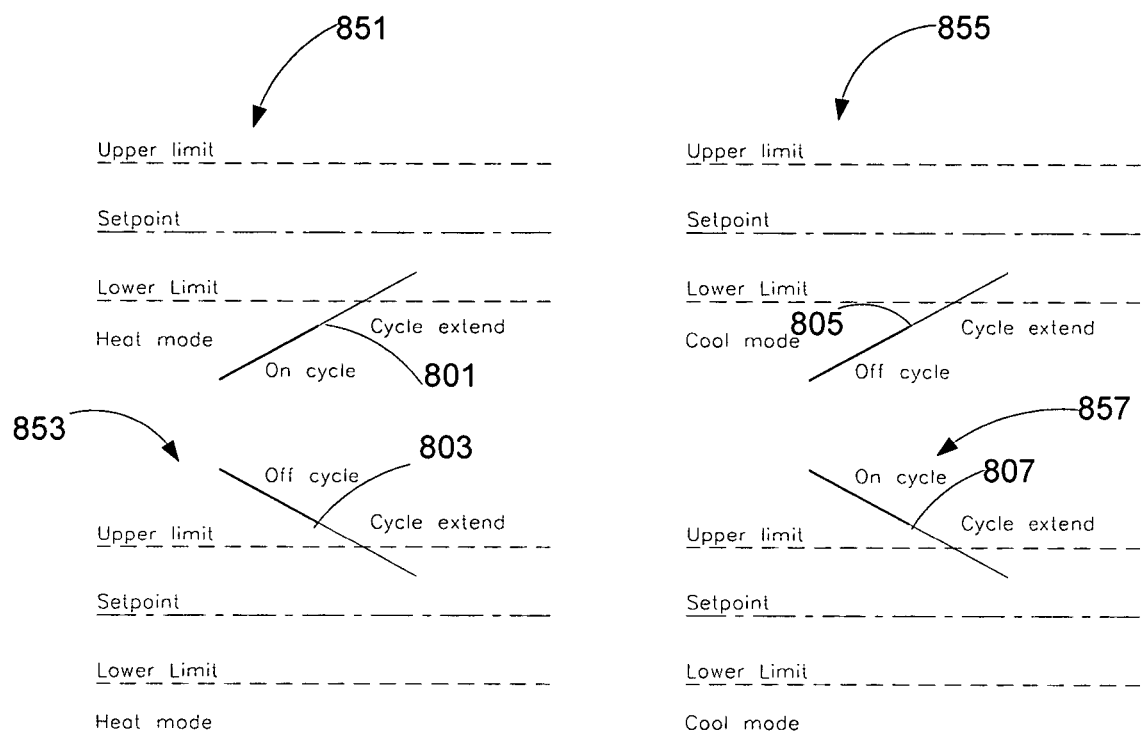
FIG. 8 illustrates cycle extension capability in accordance with an embodiment of the invention.

FIG. 8 illustrates cycle extension capability in accordance with an embodiment of the invention. The controller supervisor continuously checks conditions 851, 853, 855, and 857 for both the heating mode and the cooling mode. At the end of an on or off-cycle, the controller supervisor determines if the current control cycle needs to be extended to drive the room temperature into the temperature band. If so, the controller supervisor extends the current control cycle for ⅛ design cycle time. (The extension of the control cycle corresponds to temperature points 801, 803, 805, and 807.) Similar to cycle cut, when extending the control cycle, the current duty cycle may be far away from the steady state. The controller supervisor can adjust the duty cycle accordingly so that the duty cycle controller can reach steady state in a shorter time. The following pseudo code corresponds to a process that supports the cycle extension capability.

```
if      {   [ (Heat mode) and (Output On) and (Rtemp<Lower Limit) ]
    or  [ (Heat mode) and (Output Off) and (Rtemp>Upper Limit) ]
    or  [ (Cool mode) and (Output Off) and (Rtemp<Lower Limit) ]
    or  [ (Cool mode) and (Output On) and (Rtemp>Upper Limit) ]
        }
    and
        {   Current cycle end
        }
then
            if          {   Output On
                        }
            then
                                        increase duty cycle
            else
                                        decrease duty cycle
            endif
            Continue current cycle for another ⅛ design cycle time
Endif
```

Figure 9:
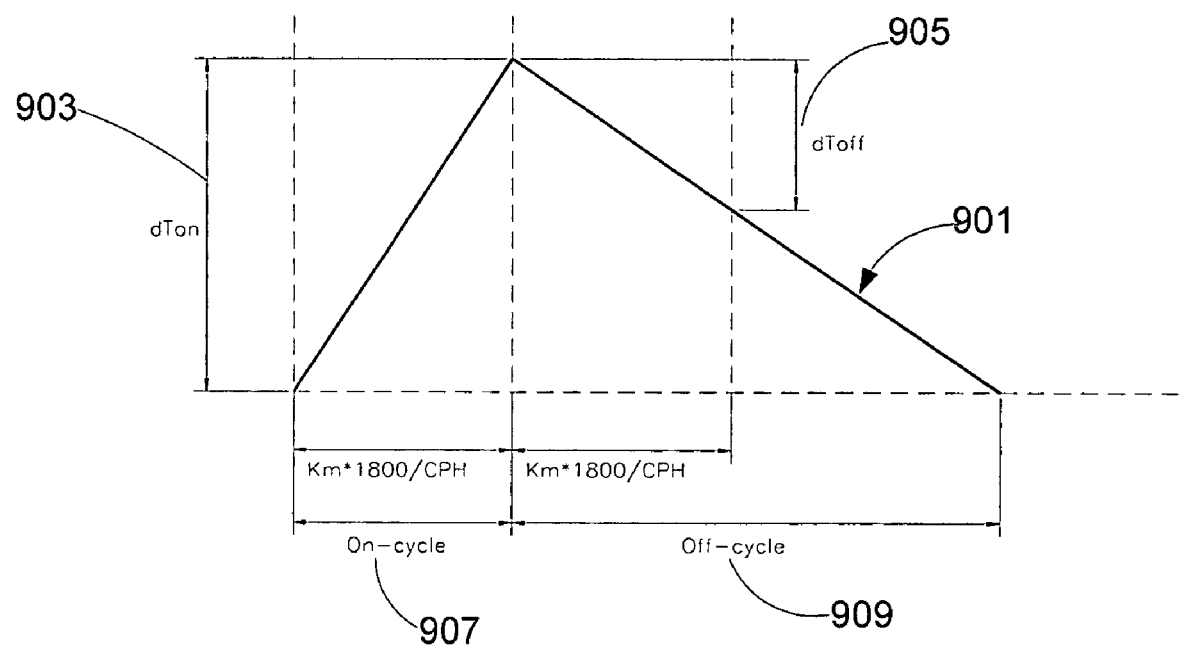
FIG. 9 shows determining whether a room temperature is excessively outside a temperature band with an embodiment of the invention.

FIG. 9 shows a determination of a temperature band that is associated with controlling room temperature 901 in accordance with an embodiment of the invention. (As previously discussed, the controller supervisor confines the room temperature within the temperature band.) The temperature band is determined according to the maximum temperature swing when the controller is in steady state. During steady state, if duty cycle is smaller than 0.5, the temperature changing rate is larger when the output is turned on. If duty cycle is larger than 0.5, the temperature changing rate is larger when the output is turned off. One can take the temperature change during on-cycle as the temperature band when the duty cycle is smaller than 0.5, or the off-cycle temperature change as the temperature band when the duty cycle is larger than 0.5.

In FIG. 9, duty cycle<0.5.

dTon 903: Temperature changed in on-cycle dToff 905: Temperature changed in off-cycle, for the time same as on-cycle As shown in FIG. 9, on-cycle time 907 is equal to Km*1800/CPH for a duty cycle smaller than 0.5. Also, dTon 903 is the same as the temperature variance at steady state. This means that dTon 903 can be taken as the temperature band value. For a duty cycle>0.5, off-cycle time 909 is equal to Km*1800/CPH and so dToff 905 can be equated as the temperature band value (note that dToff 905 will also larger than dTon 903 when duty cycle>0.5). Typically, the temperature band is the moving average with the previous values. The temperature band can also be clipped within certain value, e.g., 2.5 degrees Fahrenheit, to minimize the effect of external disturbance. Also, due to the delay of the temperature measurement component, the measured temperature changing rate is typically smaller when the system is cycling then when the system is fully turned on or off. The values taken during system fully-on or off should not be used as these are not the conditions at steady state.

Figure 20:
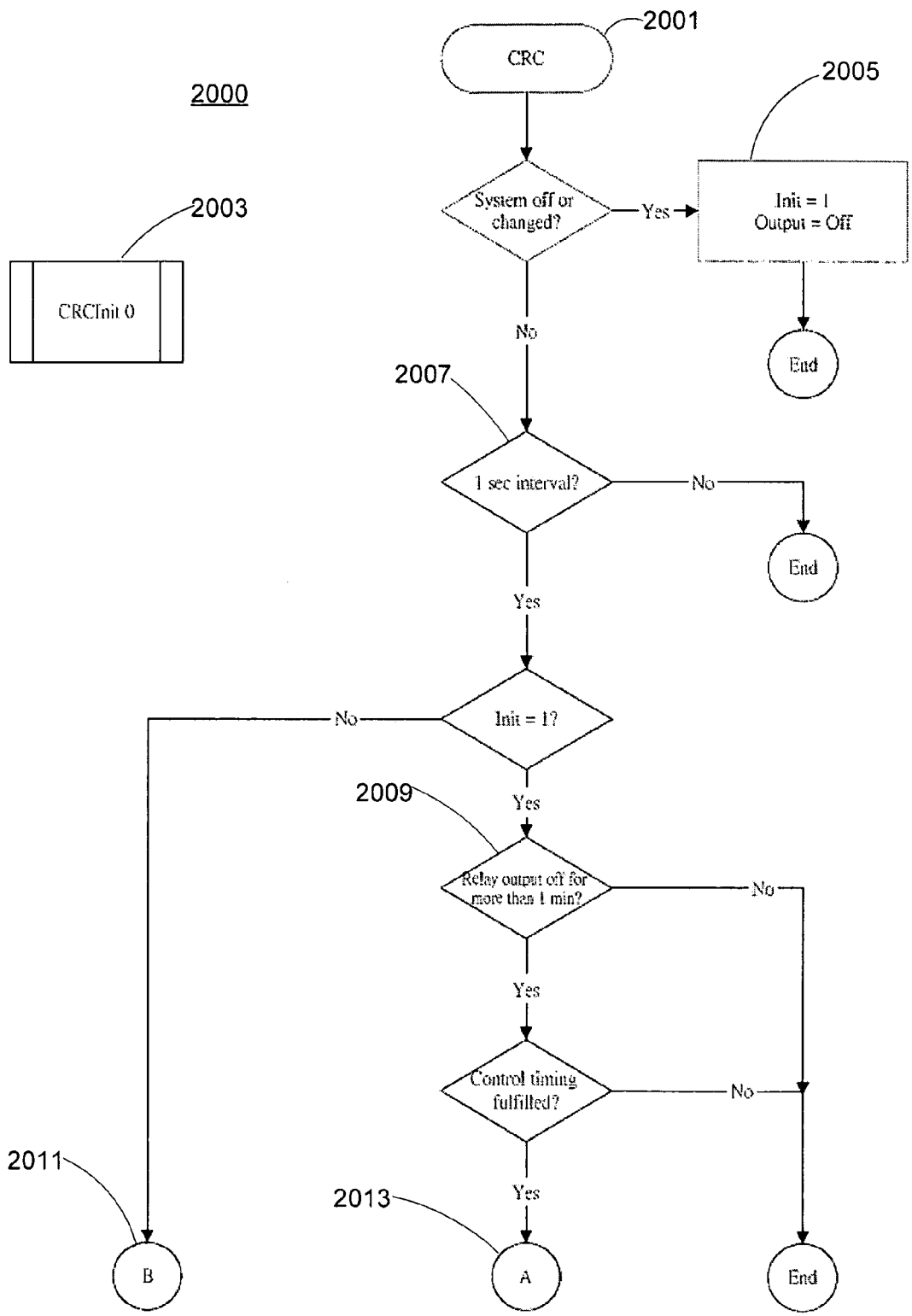
FIGS. 20-30 show a flow diagram for a cycle rate control process in accordance with another embodiment of the invention.

FIGS. 20-30 show a flow diagram for a cycle rate control procedure in accordance with another embodiment of the invention. In flow diagram 2000, as shown in FIG. 20, "system" refers to the system selection of a thermostat. Typical selections include "heat," "cool," and "off." The term "output" refers to an output request of the CRC module.

In step 2001, the cycle rate control (CRC) process commences. Step 2003 refers to a routine CRCInit0, which is called when the thermostat first starts up. In step 2005, the variable Init is set to '1" in order to reset the control process. The variable Init may also be externally set. As shown in step 2007, the CRC process operates every one second. As shown in step 2009, the relay output turns off for at least one minute after each initialization. Flow diagram 2000 continues for normal CRC control in step 2011 and for initialization in step 2013.

Figure 21:
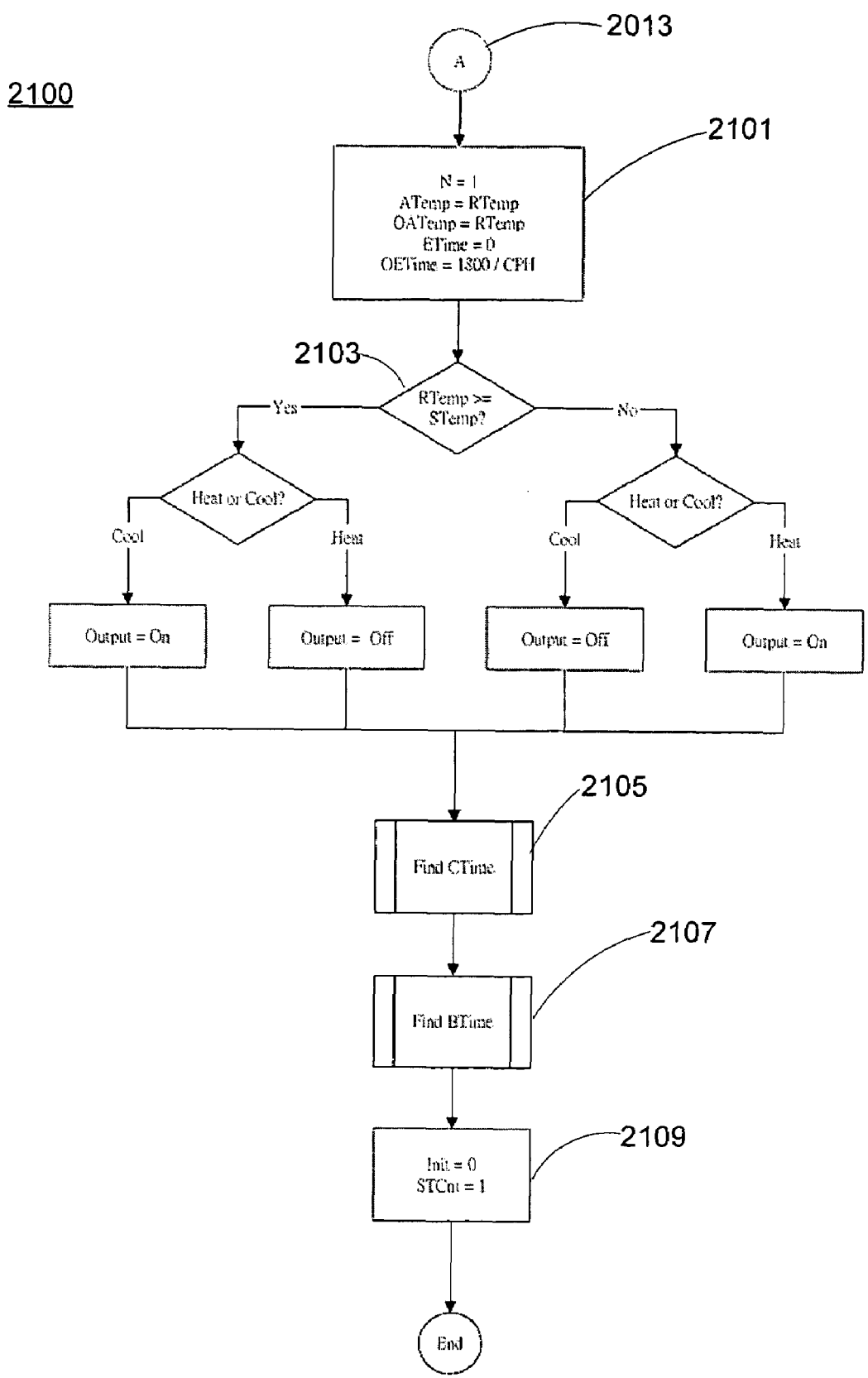
Figure 22:
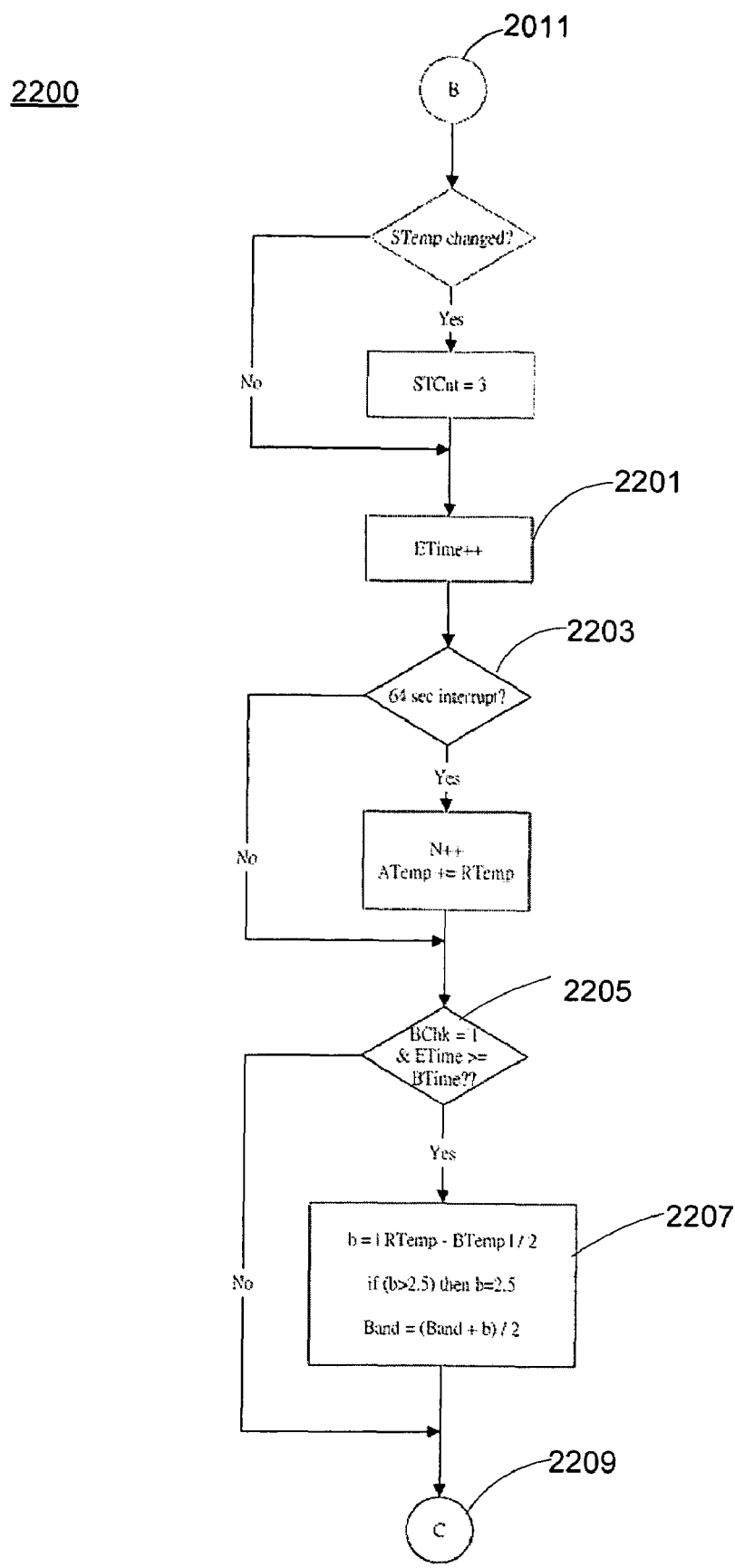
Figure 23:
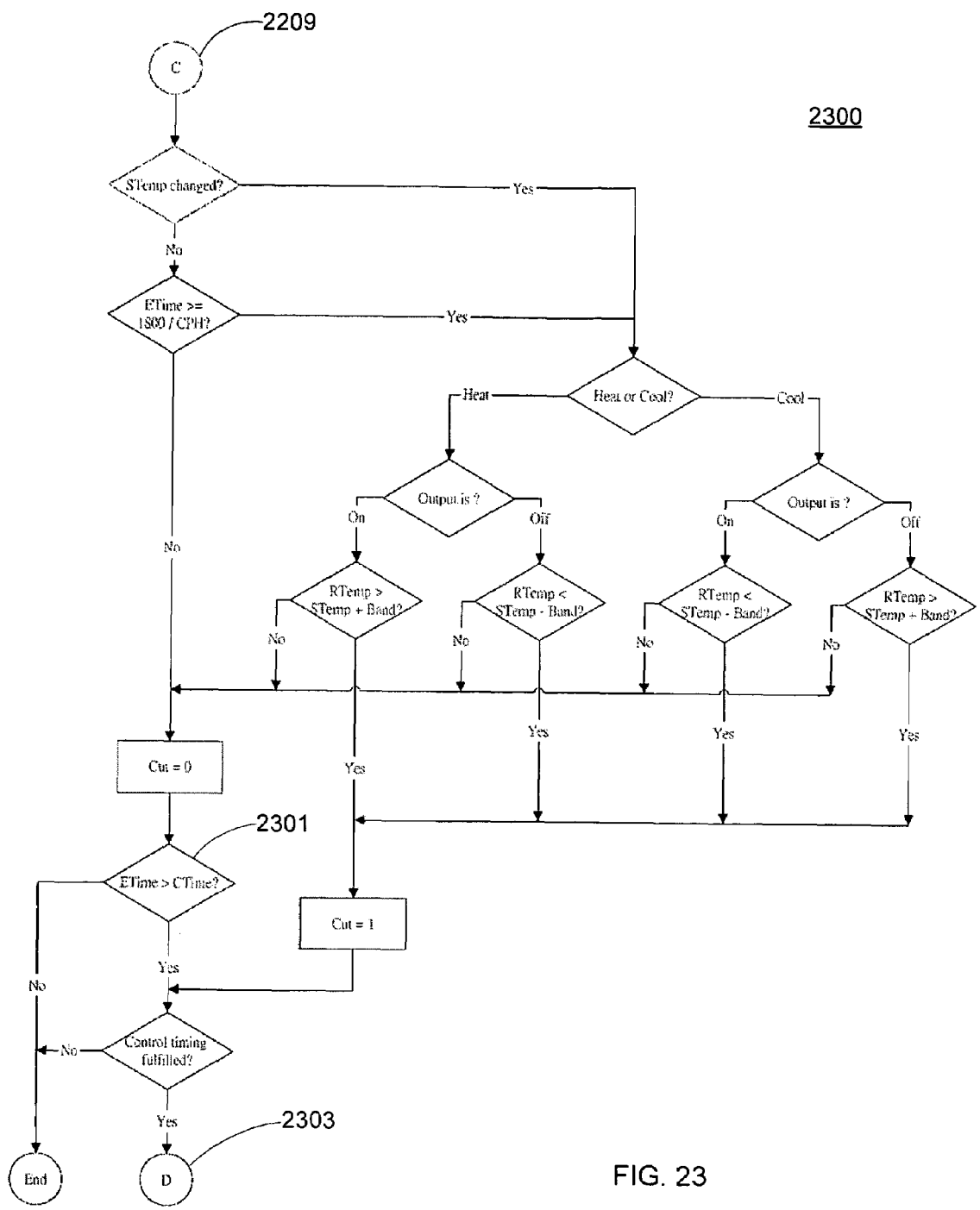
Figure 28:
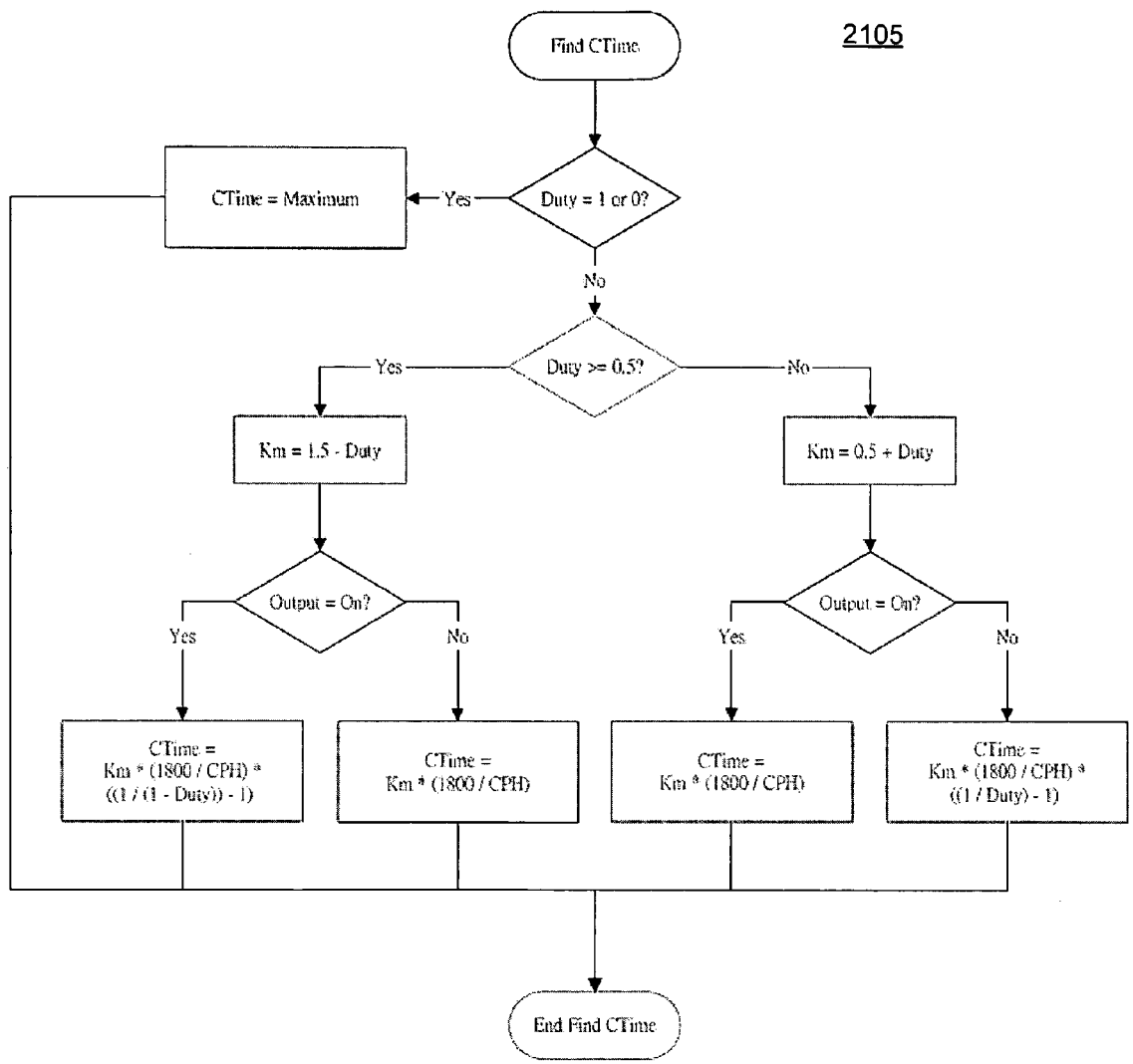
Figure 29:
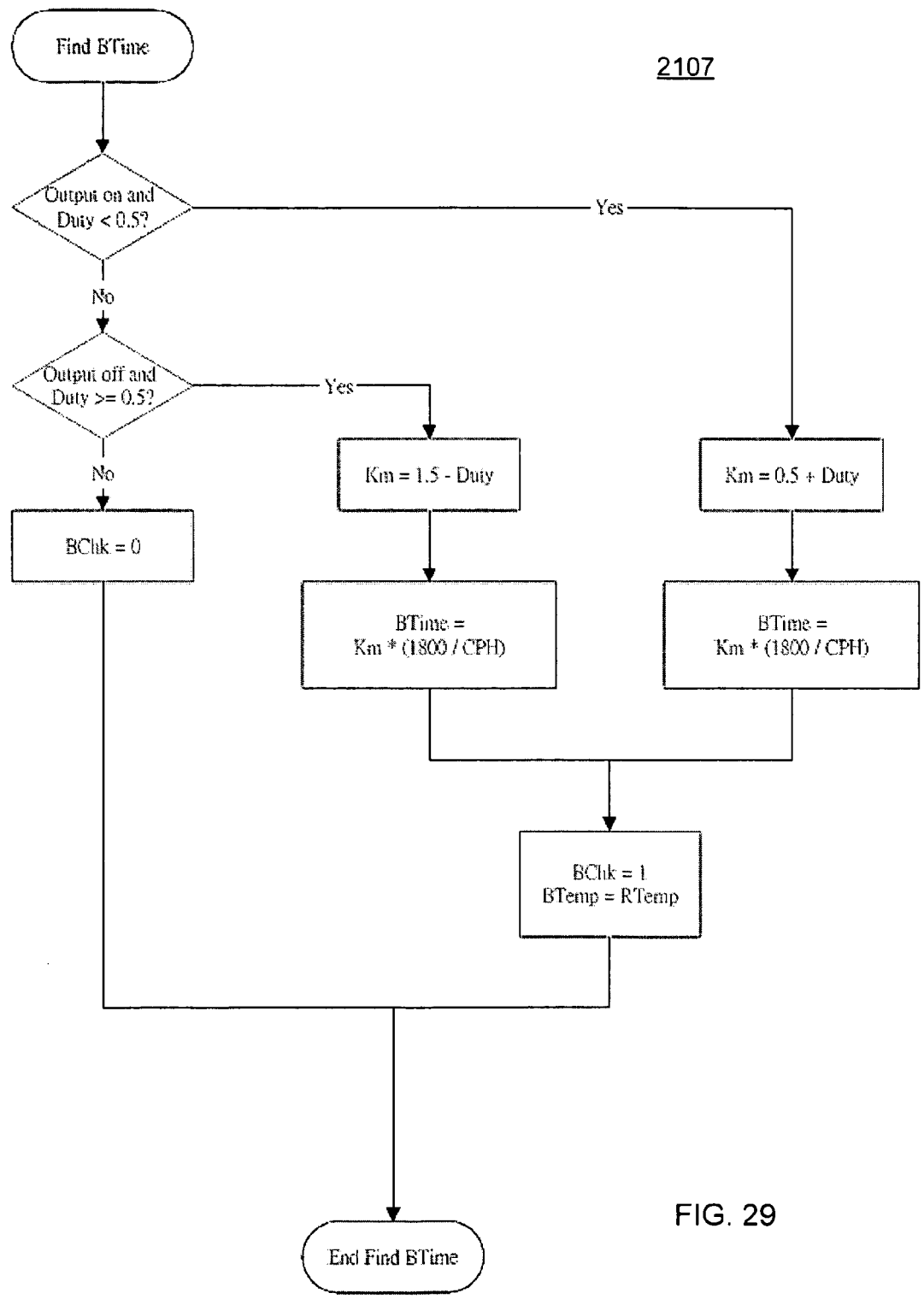

As shown in FIG. 21, flow diagram 2100 is a continuation of flow diagram 2000. Procedure 2100 performs an initialization for the cycle rate control process. As shown in step 2101, N corresponds to the number of temperature samples in variable ATemp, ATemp is average room temperature, OATemp is the old (previous) average temperature, RTemp is the current room temperature, ETime is the elapsed time from the start of the On/Off cycle, and OETime is ETime of the previous On/Off cycle. With step 2105, a procedure (as shown in FIG. 28) is executed to determine CTime (referring to EQ. 11a, EQ. 11b, EQ. 12a, and EQ. 12b). With step 2107, a procedure (as shown in FIG. 29) is executed to determine Btime. As shown in FIG. 22, ETime is compared with BTime in step 2207 to determine if the temperature band should be updated. As shown in FIG. 23, ETime is compared with CTime in step 2303 to determine whether the current cycle should be completed. With step 2109, the initialization procedure is completed and the value of Init is set to '0'. By setting the value of STCnt to non-zero, external parameters are not confirmed is different events, e.g., the system or the set temperature being changed.

As shown in FIG. 22, flow diagram 2200 is a continuation of flow diagram 2000. Procedure 2200 performs normal cycle rate control during each cycle. In step 2201, ETime (elapsed time since the start of an on or off cycle) is incremented. In step 2203, the room temperature is sampled every 64 seconds to determine the average temperature. Step 2205 determines if the temperature band should be updated. If so, step 2207 determines the temperature band. In step 2209, procedure 2200 continues to procedure 2300 as shown in FIG. 23.

As shown in FIG. 23, flow diagram 2300 is a continuation of flow diagram 2200. Procedure 2300 performs cycle cut checking, which is a function of the controller supervisor. Step 2301 determines if the set temperature (STemp) has changed and consequently procedure 2300 determines if the current cycle should be cut. Procedure 2300 continues to procedure 2400 in step 2305.

Figure 24:
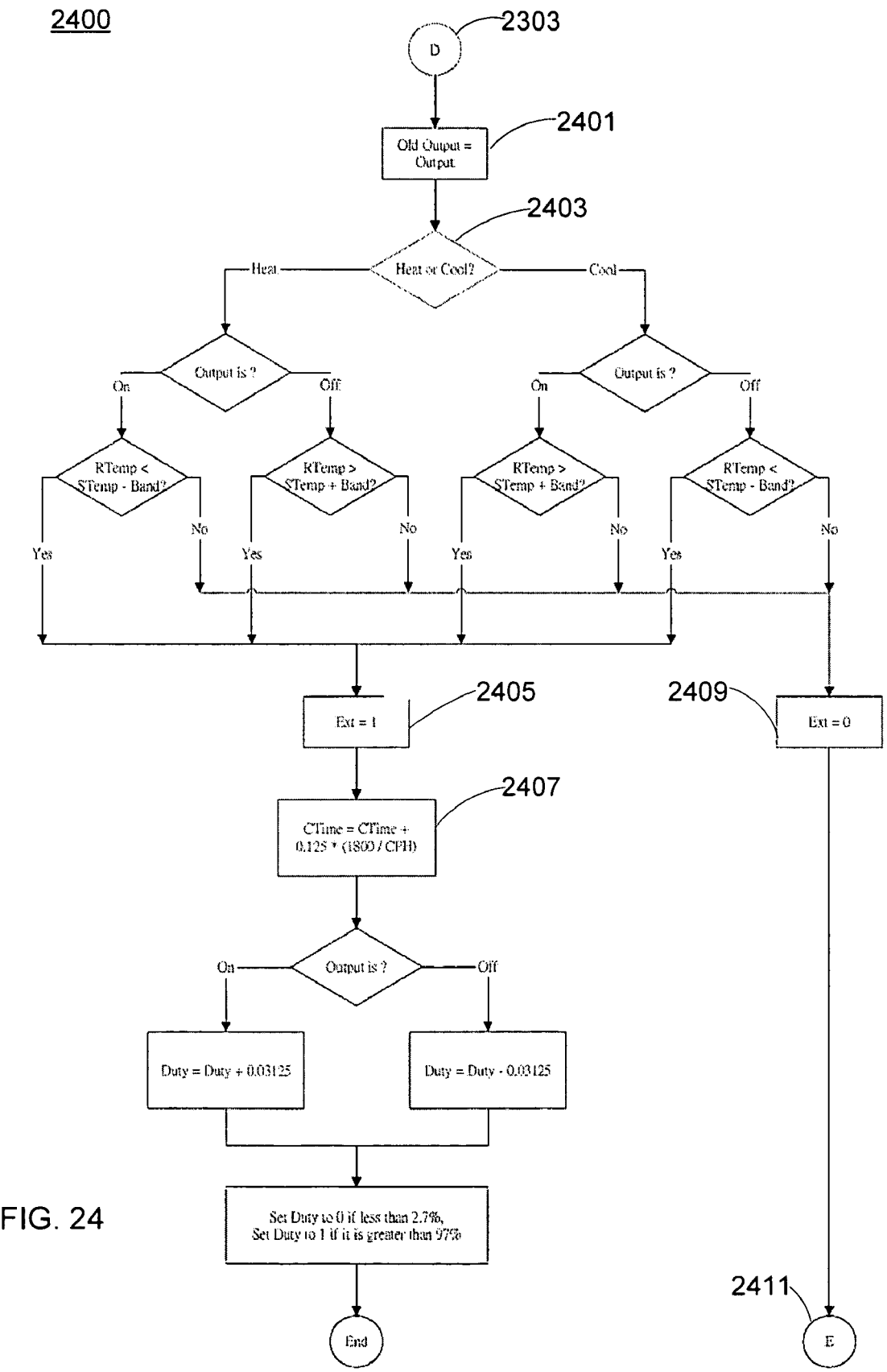

As shown in FIG. 24, flow diagram 2400 is a continuation of flow diagram 2300. Procedure 2400 performs cycle extend checking, which is a function of the controller supervisor. In step 2401, the value of the output variable is saved since it will be changed if a new on or off cycle is started. (OldOutput is used to check if the output has been changed.) In step 2403, the room temperature is checked to determine if it is out of the temperature band. In step 2405, the current on or off cycle is extended and the CTime variable is adjusted to extend the current cycle. The Duty variable (corresponding to the duty cycle) is also adjusted to increase the overall response. Procedure 2400 continues to procedure 2500 in step 2411.

Figure 25:
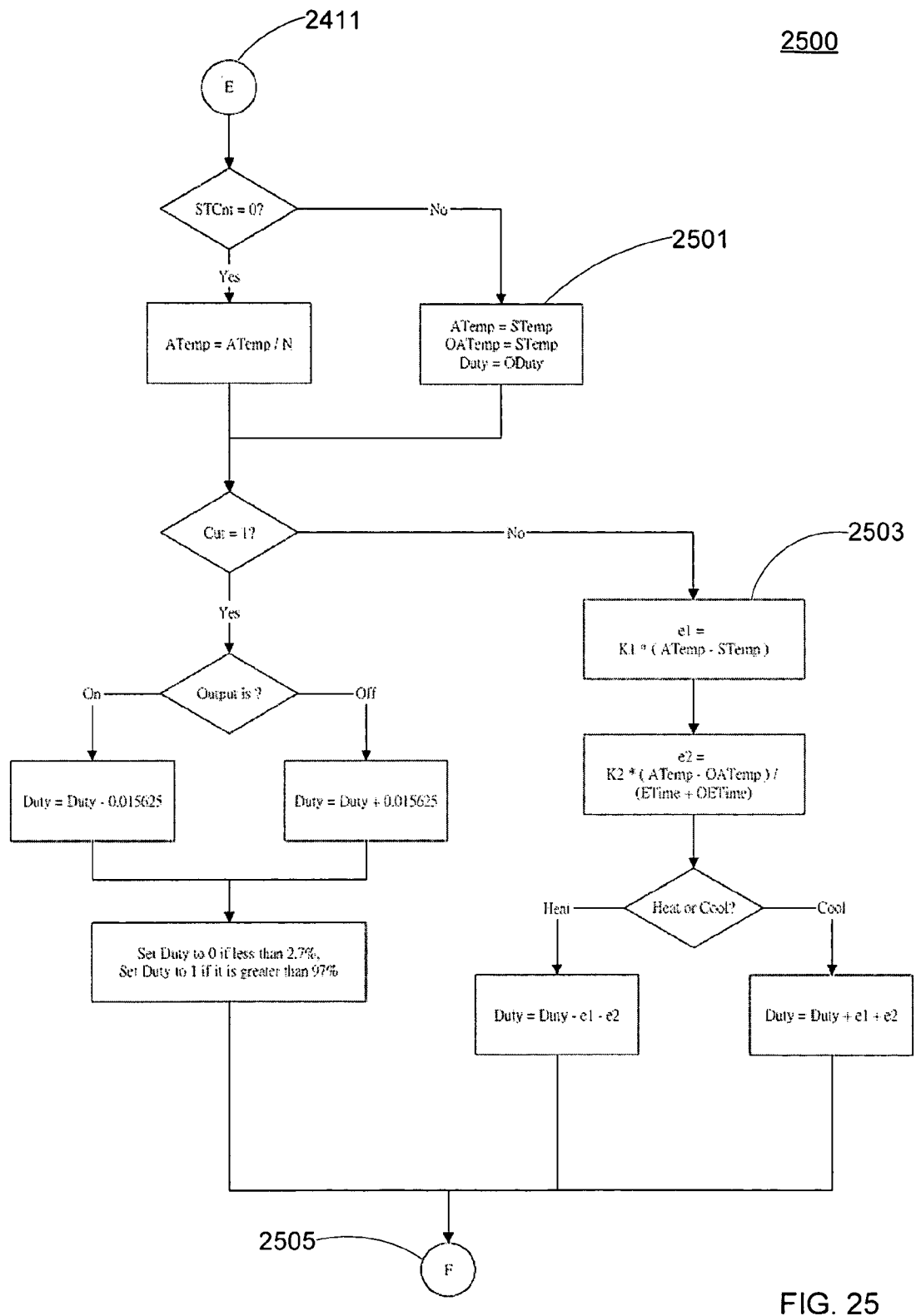

As shown in FIG. 25, flow diagram 2500 is a continuation of flow diagram 2400. Procedure 2500 starts a new cycle and determines a new duty cycle. In step 2501, if the value of STCnt is non-zero, the cycle rate control process does not calculate the average temperature. Rather, the set temperature is used as the average temperature so that the control status does not change excessively. If the value of STCnt is non-zero, the external parameters are not confirmed. In step 2503, K1 and K2 correspond to controller gain settings. The gain settings can be user determined values or can be automatically adjusted by another level of supervision. Process 2500 continues to procedure 2600 in step 2505.

Figure 26:
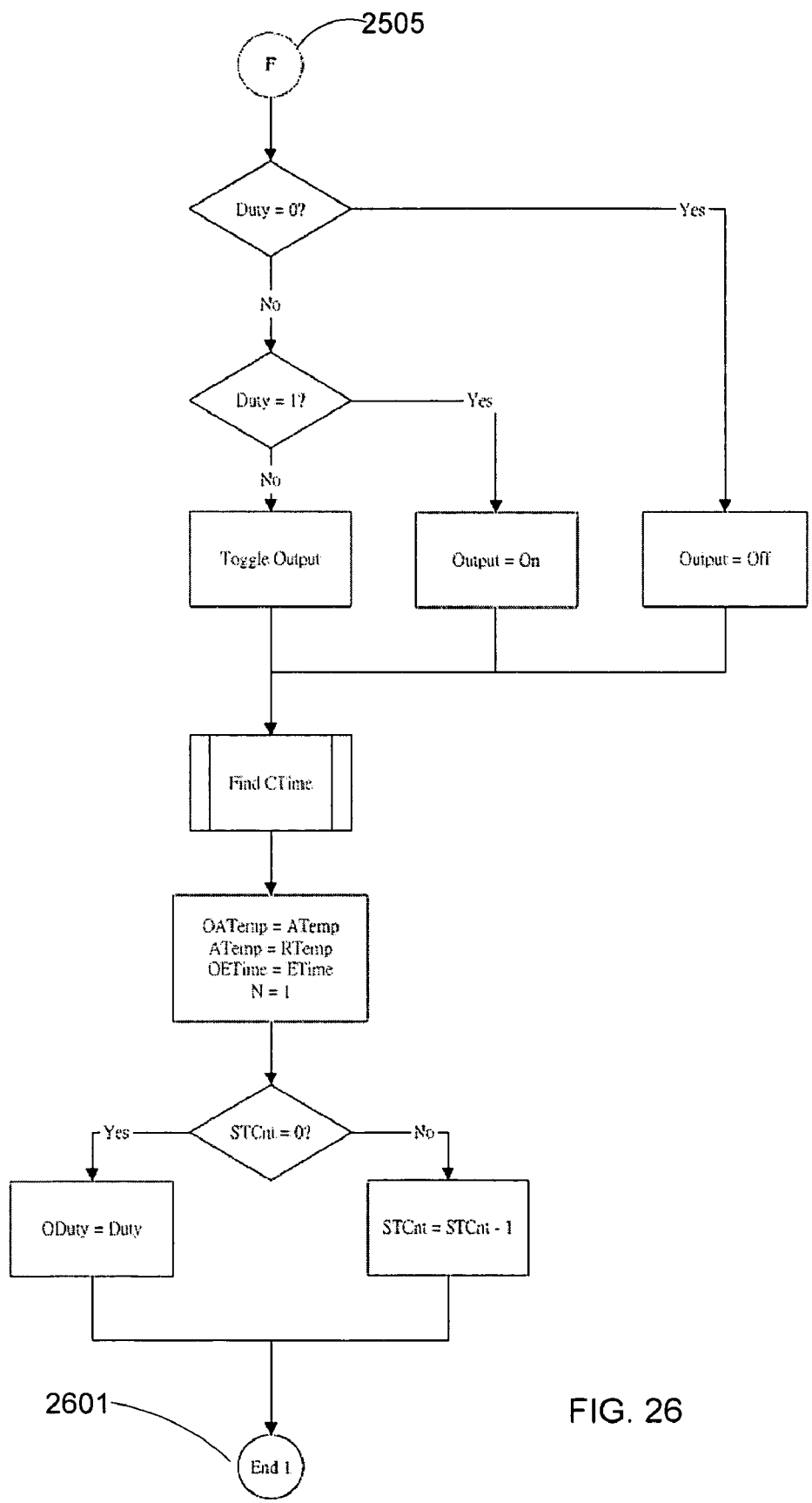
Figure 27:
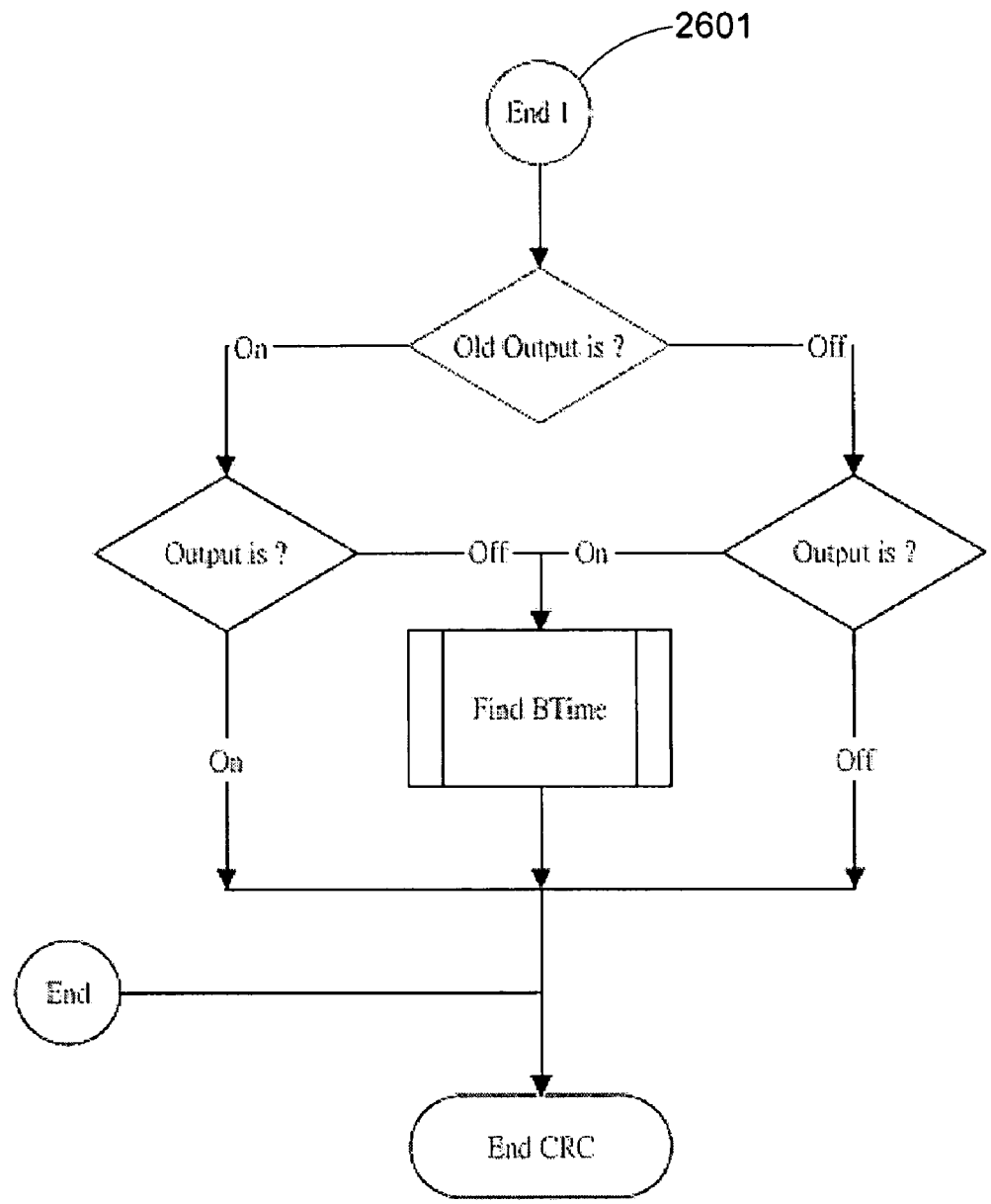

As shown in FIG. 26, flow diagram 2600 is a continuation of flow diagram 2500. Procedure 2600 is a continuation of procedure 2500 for starting a new cycle. Procedure 2600 continues to procedure 2700 (as shown in FIG. 27) in step 2601. Flow diagram 2700 is used to check if the output has been changed. If so then a new BTime is calculated.]

Figure 30:
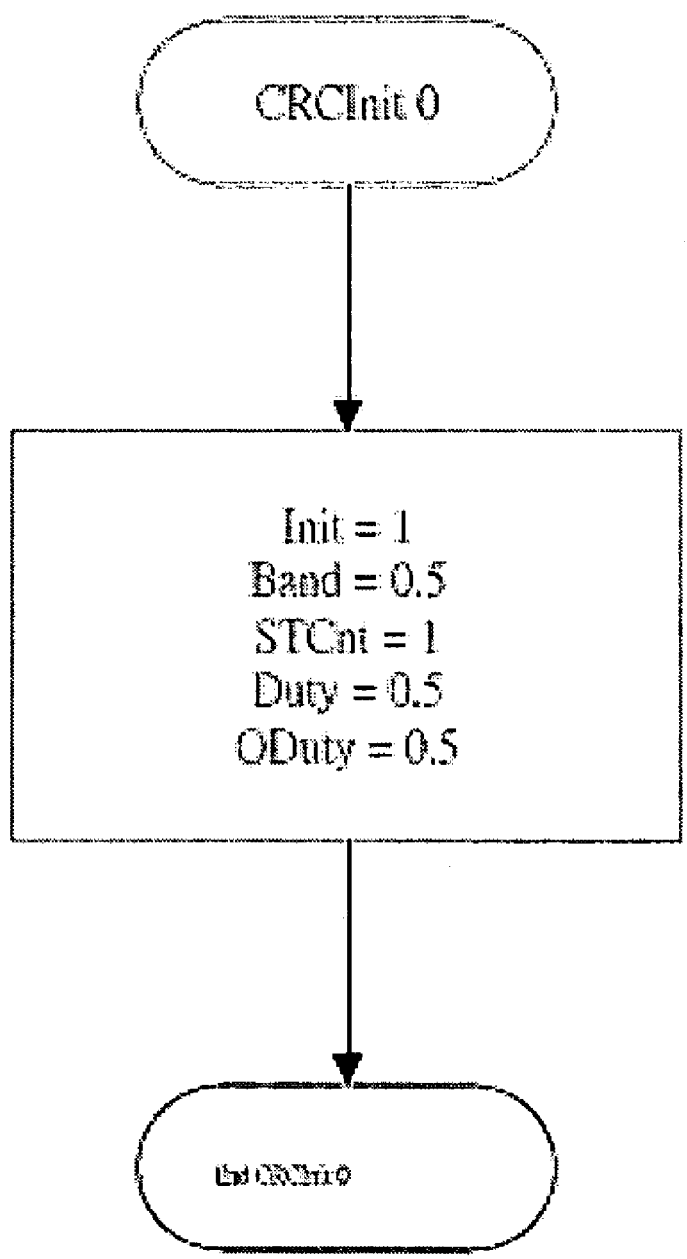

FIG. 28 shows a flow diagram for the CTime procedure (referenced in step 2105 in FIG. 21). FIG. 29 shows a flow diagram for the BTime procedure (referenced in step 2107 in FIG. 21). FIG. 30 shows a flow diagram for the CRCInit0 procedure (referenced in step 2003 as shown in FIG. 20).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus that controls a temperature of a room, the apparatus comprising:
 a temperature sensor that measures the temperature; and
 a processing unit that controls an environmental control unit and that is configured to perform:
 (a) determining a control mode;
 (b) if the control mode equals a span control mode, adjusting a current total span of a current control cycle based on a desired cycle time and a previous cycle time; and
 (c) if the control mode equals a duty cycle control mode, adjusting a duty cycle of the current control cycle based on an error of a previous control cycle.

2. The apparatus of claim 1, wherein the processing unit is further configured to perform:
 (b)(i) obtaining a previous total span of the previous control cycle; and
 (b)(ii) multiplying the previous total span by a multiplicative factor.

3. The apparatus of claim 1, wherein the multiplicative factor is determined from a ratio equal to the desired cycle time divided by the previous cycle time.

4. The apparatus of claim 1, wherein the processing unit is further configured to perform:
 (c)(i) determining the error from a setpoint temperature and a predicted temperature.

5. The apparatus of claim 4, wherein the predicted temperature is based on an average temperature and a temperature change of the previous control cycle.

6. The apparatus of claim 4, wherein the processing unit is further configured to perform:
 (c)(ii) multiplying the error by an attenuation factor.

7. The apparatus of claim 6, wherein the processing unit is further configured to perform:
 (c)(iii) adjusting the attenuation factor to match a characteristic of the room.

8. The apparatus of claim 1, wherein the environmental control unit comprises a heating unit.

9. The apparatus of claim 1, wherein the environmental control unit comprises a cooling unit.

10. The apparatus of claim 1, wherein the processing unit is further configured to perform:
 (a)(i) if a cycle rate exceeds a predetermined limit, setting the control mode to the duty cycle control mode; and
 (a)(ii) if the cycle rate is less than or equal to the predetermined limit, setting the control mode to the span control mode.

* * * * *